Sept. 23, 1969            L. J. KISS            3,468,177
POSITIVE DRIVE CONTINUOUS GEAR-MESH SHIFTING
MULTISPEED TRANSMISSION SYSTEM
Filed Feb. 21, 1967            10 Sheets-Sheet 3
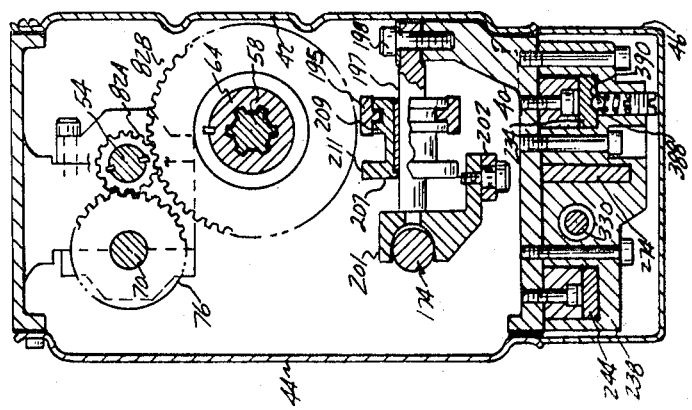
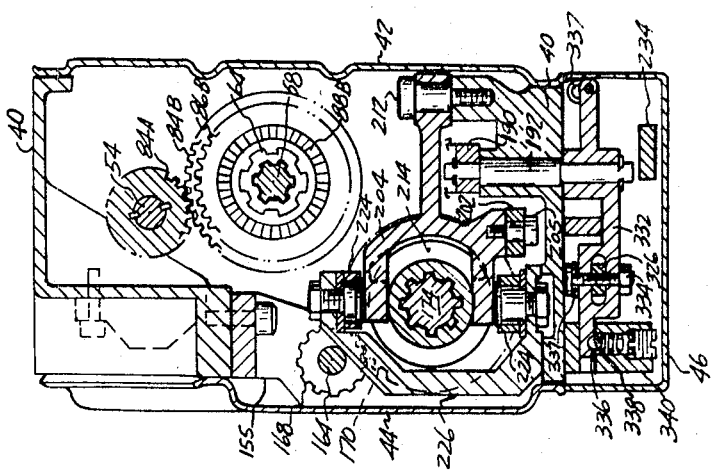
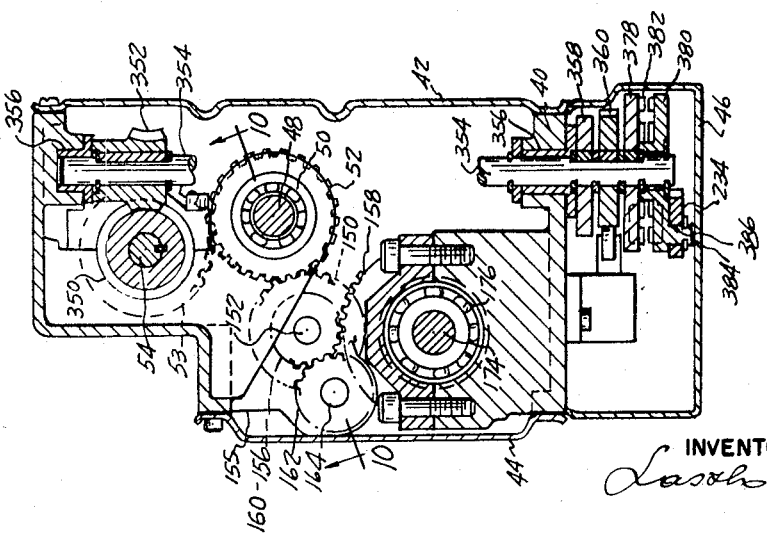
INVENTOR
Laszlo J. Kiss
BY
ATTORNEYS Sept. 23, 1969　　　　　　L. J. KISS　　　　　　3,468,177
POSITIVE DRIVE CONTINUOUS GEAR-MESH SHIFTING
MULTISPEED TRANSMISSION SYSTEM
Filed Feb. 21, 1967　　　　　　　　　　　　　　　10 Sheets-Sheet 4
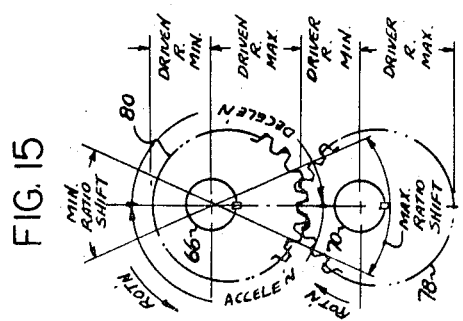
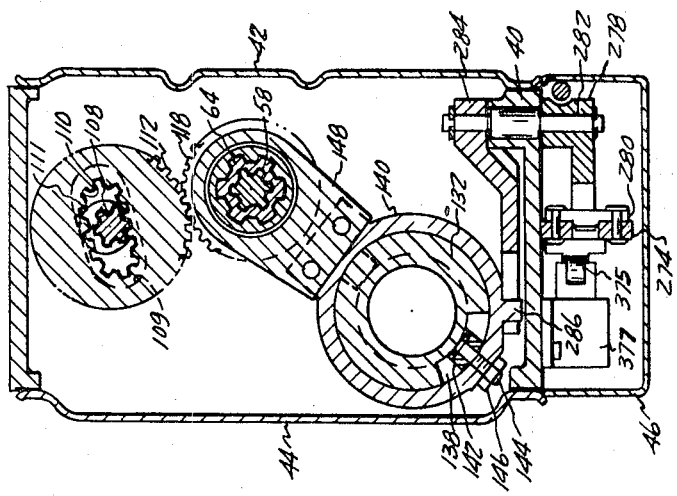
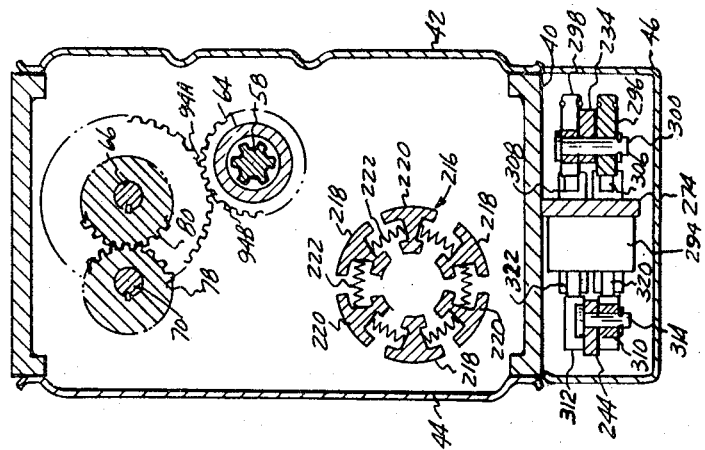
INVENTOR
Laszlo J. Kiss
BY
ATTORNEYS Sept. 23, 1969 L. J. KISS 3,468,177
POSITIVE DRIVE CONTINUOUS GEAR-MESH SHIFTING
MULTISPEED TRANSMISSION SYSTEM
Filed Feb. 21, 1967 10 Sheets-Sheet 5
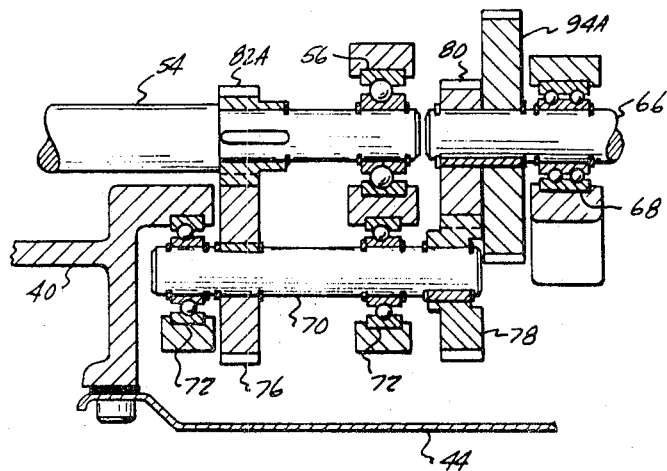
FIG. 9
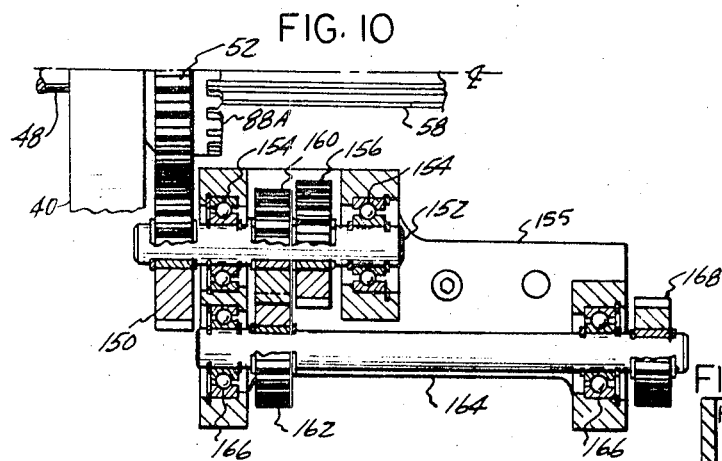
FIG. 10
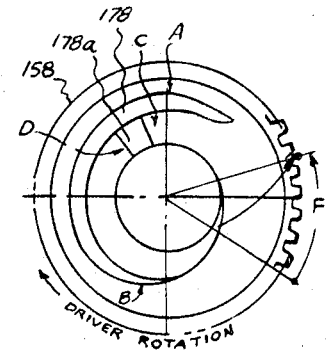
FIG. 21
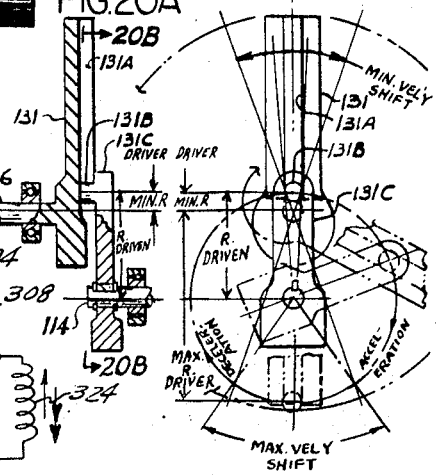
FIG. 20A
FIG. 20B
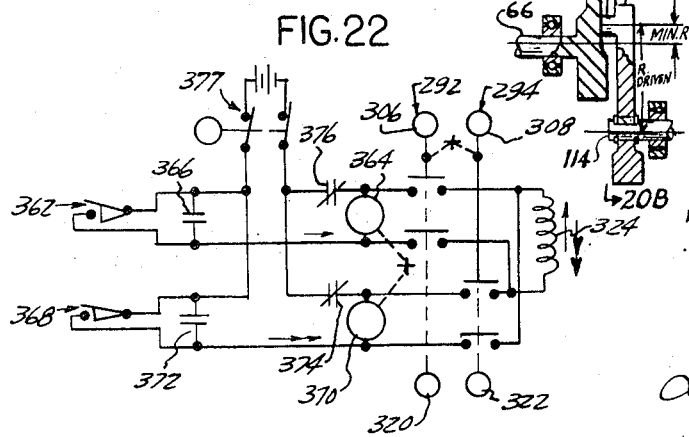
FIG. 22
INVENTOR
Laszlo J. Kiss
BY
ATTORNEYS Sept. 23, 1969          L. J. KISS          3,468,177
POSITIVE DRIVE CONTINUOUS GEAR-MESH SHIFTING
MULTISPEED TRANSMISSION SYSTEM
Filed Feb. 21, 1967          10 Sheets-Sheet 6
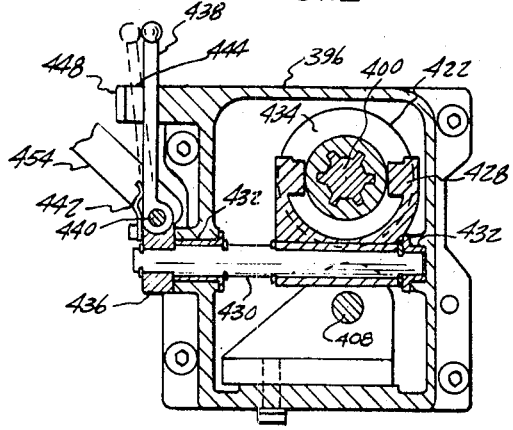
FIG.12
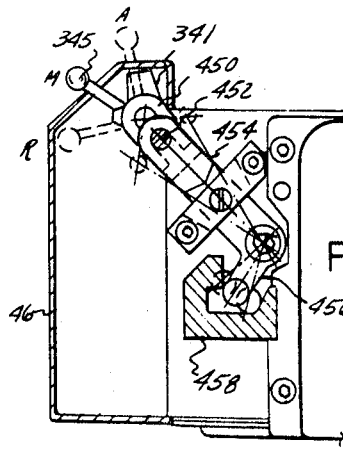
FIG.13
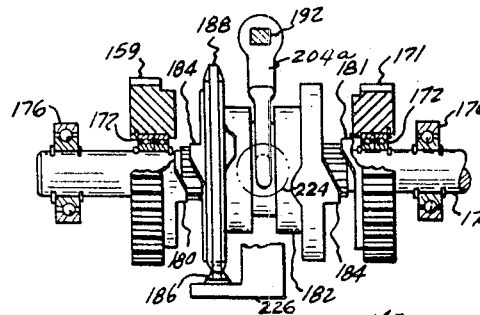
FIG.2A
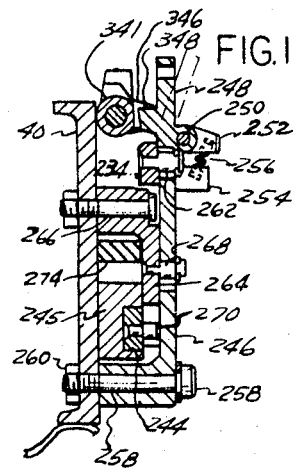
FIG.11
FIG.23
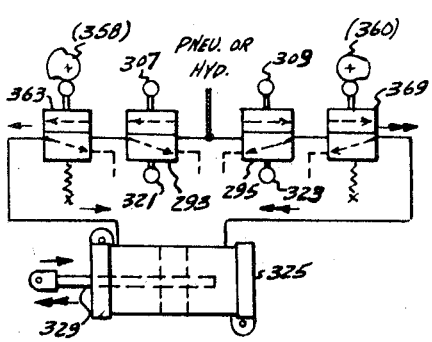
FIG.22A
INVENTOR
Laszlo J. Kiss
BY
ATTORNEYS

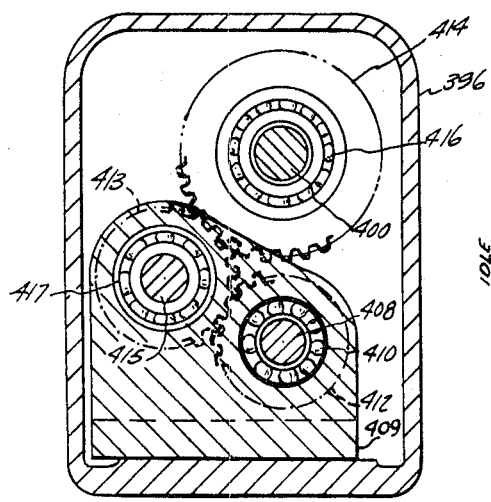
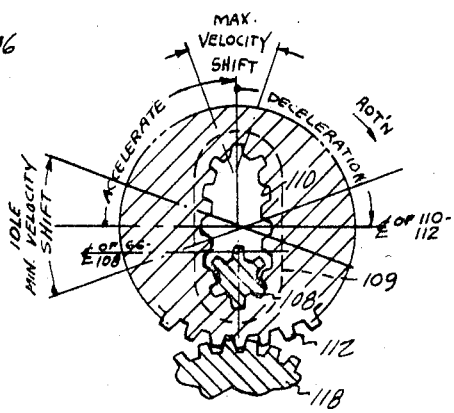
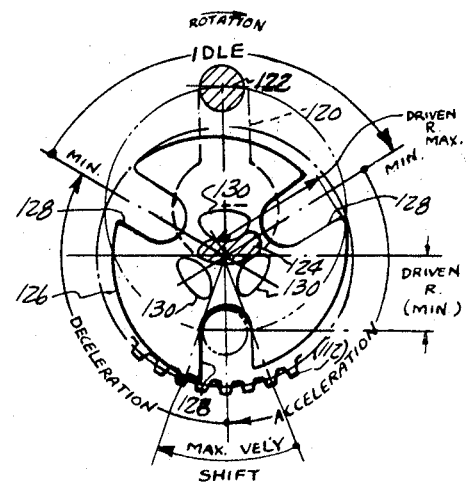
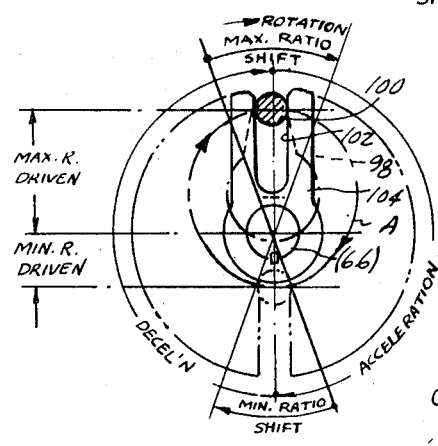

Sept. 23, 1969  L. J. KISS  3,468,177
POSITIVE DRIVE CONTINUOUS GEAR-MESH SHIFTING
MULTISPEED TRANSMISSION SYSTEM
Filed Feb. 21, 1967  10 Sheets-Sheet 8
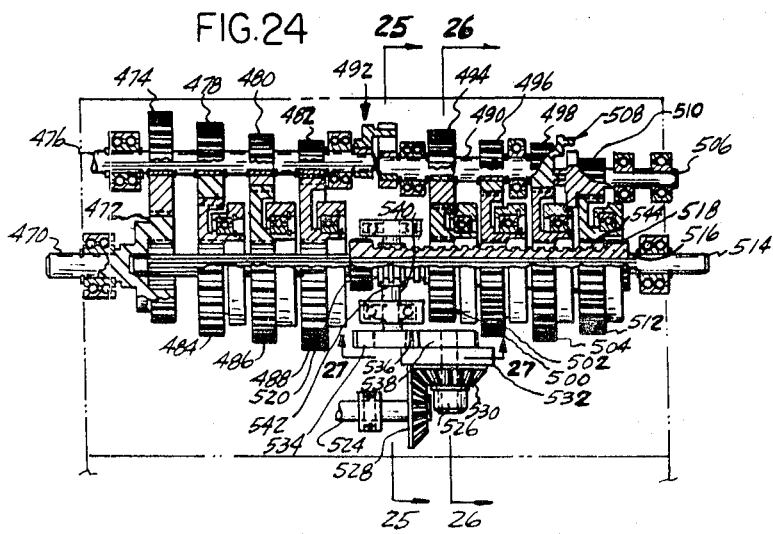
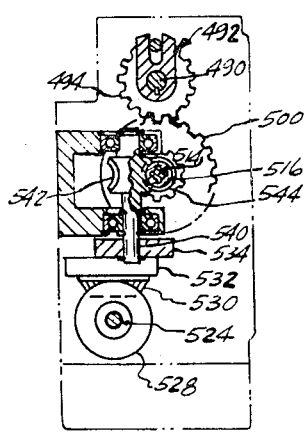
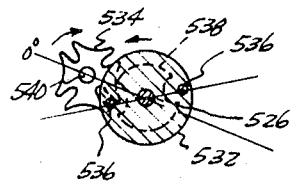
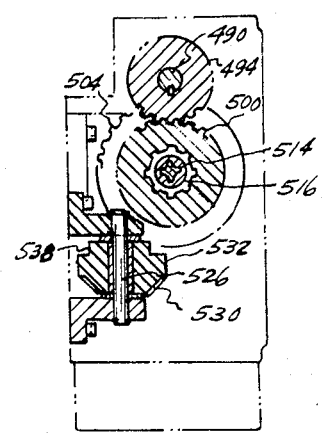
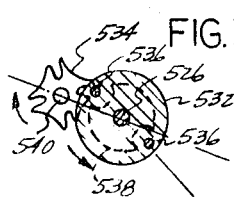
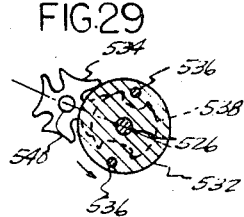
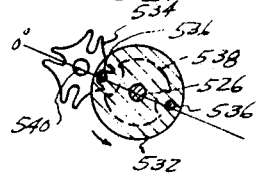

Sept. 23, 1969  L. J. KISS  3,468,177
POSITIVE DRIVE CONTINUOUS GEAR-MESH SHIFTING
MULTISPEED TRANSMISSION SYSTEM
Filed Feb. 21, 1967  10 Sheets-Sheet 9
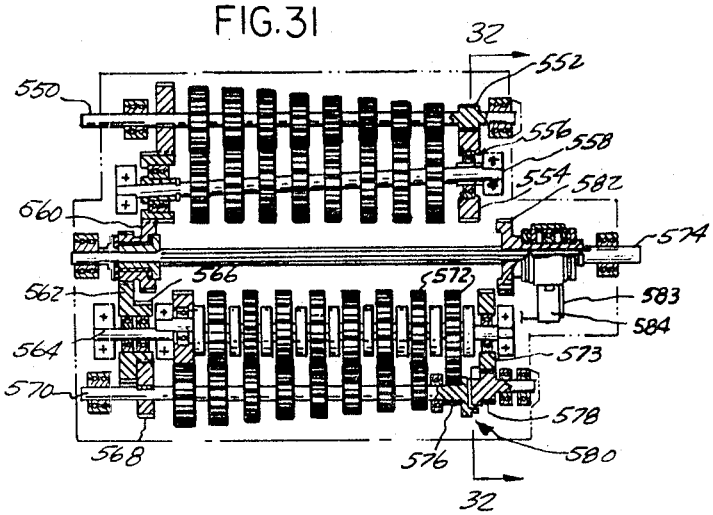
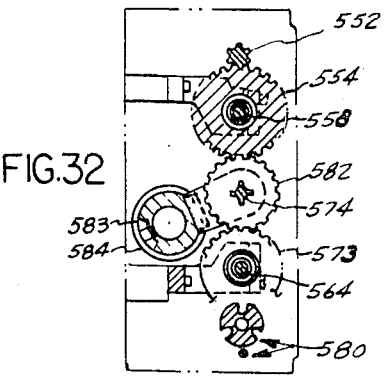
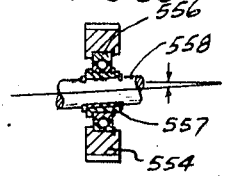
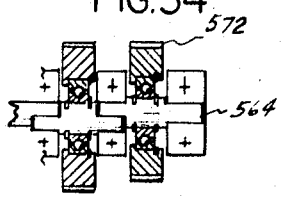
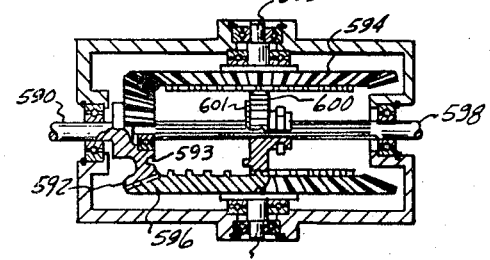
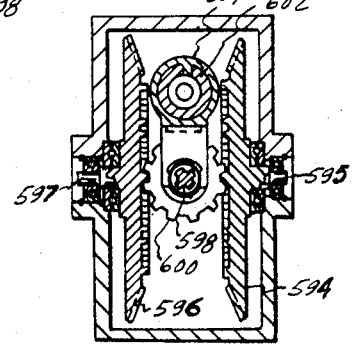
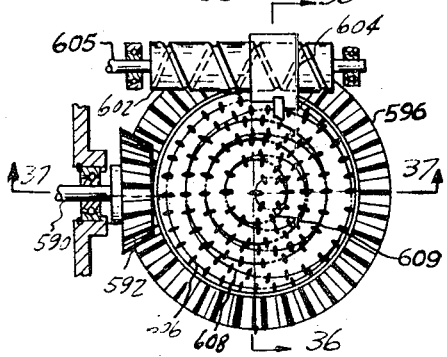
INVENTOR
Laszlo J. Kiss
BY
ATTORNEYS

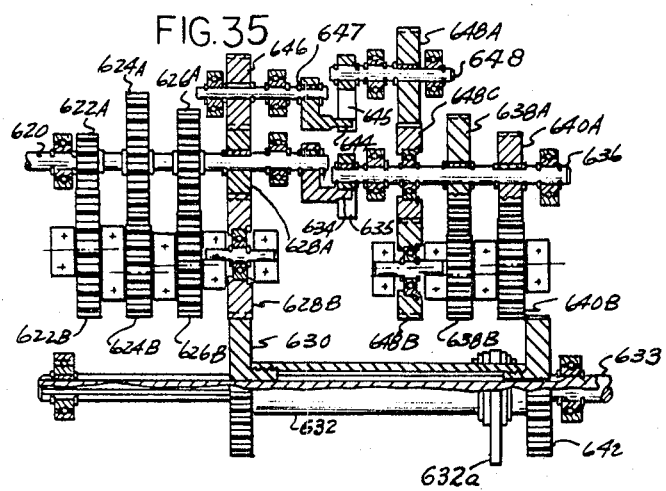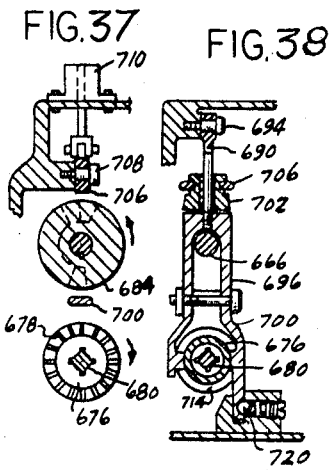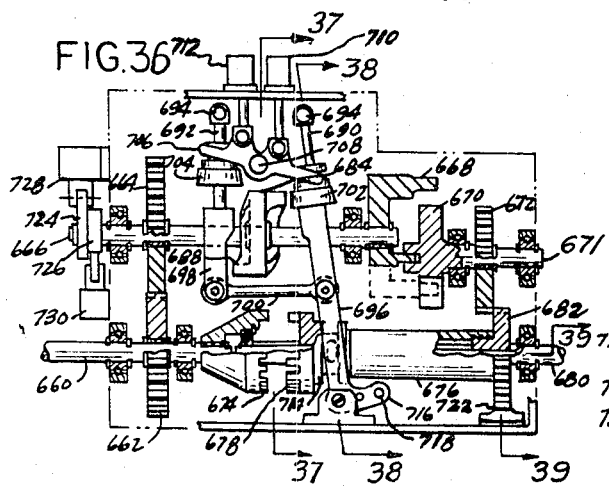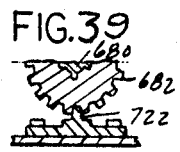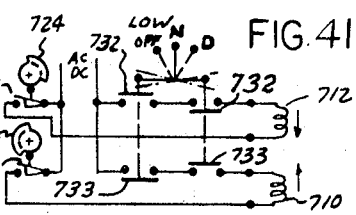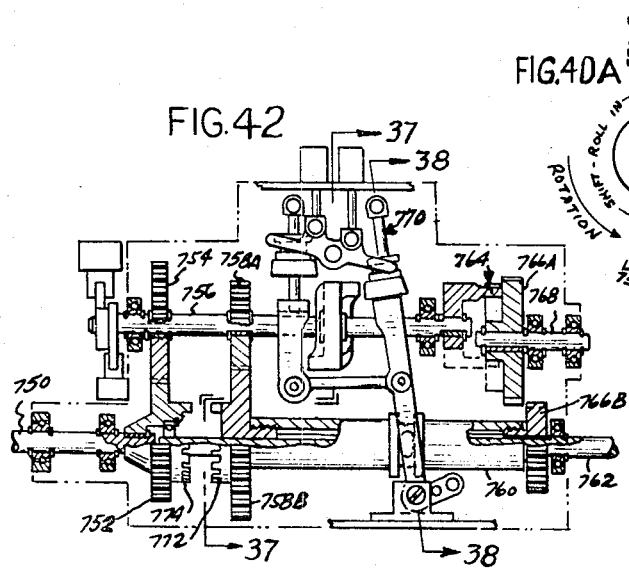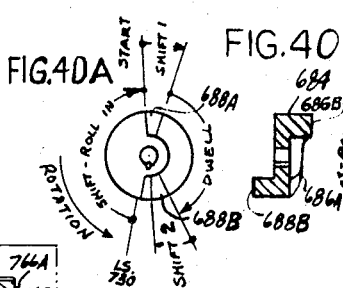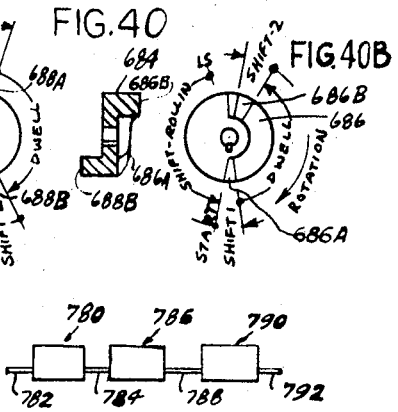

3,468,177
Patented Sept. 23, 1969

3,468,177
POSITIVE DRIVE CONTINUOUS GEAR-MESH SHIFTING MULTISPEED TRANSMISSION SYSTEM
Laszlo J. Kiss, 7044 Paige, Warren, Mich. 48091
Filed Feb. 21, 1967, Ser. No. 617,546
Int. Cl. F16b 3/38
U.S. Cl. 74—339                    37 Claims

ABSTRACT OF THE DISCLOSURE

Various embodiments of continuous gear-mesh shifting multispeed transmissions, including gear driven positive clutch devices, have permanently synchronized input shaft driven automatic shifter devices which, when selectively actuated, automatically drivingly shift from one constant speed gear train to the gear train of an input shaft driven ratio alternater, then to another constant speed gear train, or to a declutched condition in the case of a positive clutch device, the ratio alternater operating to drivingly alternate the gear ratio appropriately from one constant speed gear ratio to the next and to maintain the positive gear-mesh continuously while shifting whereby delivering uninterrupted full torque from input to output shaft even while shifting.

BACKGROUND OF THE INVENTION

Field of the invention

My invention relates to multispeed transmission systems and more particularly to improved positive drive transmission and gear driven positive clutch systems in which shiftings are accomplished with continuous gear-mesh by the application of a new principle of a ratio alternater device with an automatic positive shifter mechanism.

Description of the prior art

Automatic or manual shifting geared multispeed transmissions heretofore conventionally require clutching and declutching of the different speed gearings by different types of frictional devices such as mechanical or hydraulic clutches, brakes or coupling devices, which interrupt the driving gear-mesh during shifting so that the next gear trains may be engaged, therefore interrupting the torque delivery from the input shaft to the output shaft. Devices heretofore proposed for continuous gear-mesh shifting are either not feasible or are unworkable for various reasons. Patents of this type which are known to me are the following: U.S. Patent Nos. 970,879, 1,096,409, 1,267,619, 1,343,887, 1,515,955, 1,833,031, 2,697,365, and 2,926,538.

SUMMARY OF THE INVENTION

The present novel continuous gear-mesh shifting automatic transmission systems, including geared positive clutch systems, are adaptable for a wide variety of transmission uses. The present systems basically include an input shaft and an output shaft, with three major subsystems therebetween, namely: (A) Primary Drive System; including sets of primary driver gears positively driven by the input shaft and primary driven gears continuously driving the output shaft with different constant gear ratios when one or the other is selectively shifted into driving engagement, (B) Ratio Alternater Drive System; comprising a device driven by said input shaft and driving ratio alternater driver gears with alternately accelerating and decelerating rotational velocities produced by substantially infinitely varying the effective driving radii of the ratio alternater elements between minimum and maximum ratio values, the minimum value being proportional to a primary gear train ratio and the maximum being either proportional to another primary gear train ratio or else sufficiently high to effect a zero speed output for declutching, and (C) Positively Driven Permanently Synchronized Automatic Mechanical Shifting Mechanism; comprising a positive shifter device, also positively driven by the input shaft and operated selectively to automatically produce positive shifting in synchronous rotational cycles with respect to the minimum and maximum ratio values of the ratio alternater.

All shifting from one speed to the next is accomplished with uninterrupted continuously maintained gear-mesh engagements, the driven gears being shifted into and out of engagement simultaneously while driven by the ratio alternater: first, to effect positively synchronous mating of gears; second, to provide accurate interlocking tooth to tooth space alignment for shifting gears into and out of engagement without interference; and third, to shift gears simultaneously with sliding overlapping gear face widths, thereby always providing, in total, substantially one full gear face width engagement to ensure full torque delivery from the input shaft to the output shaft during the actual gear shifting without the need for any frictional driving device.

The positive shifter mechanisms are preferably actuated by an electrical shift signal operated manually, semi-automatically (independent of speeds involved), or fully automatic (dependent on speeds involved), or they may be controllable by other automatic systems such as punchcard or tape controls and the like. The positive shifter mechanisms, being permanently synchronized for selective automatic shifting in synchronous relation with the functional cycles of the ratio alternater, produce accurate positive shifting cycles with accurate angular cycling rotation and/or stopping of the output shaft.

An important advantage of the present shifting transmission system is that efficiency and load variations are at all times practically the same as in constant gear-mesh transmissions, and since the present system eliminates all frictional devices there will be no wear or adjustments required in use.

It will be apparent to one skilled in the art, on consideration of the following specification, that the present transmission system can be applied to various embodiments for use in the drive systems of substantially all industrial applications, where multispeed transmissions are required, where continuous gear-mesh shift is needed for uninterrupted torque delivery, where accurate automatic shift cyclings are required, and where positive clutch operations required continuous gear drive from and to zero speed and to positive locking of the output shaft at declutched positions.

DESCRIPTION OF THE DRAWINGS

For a clear understanding of my present invention, reference may be had to the accompanying drawings illustrating various preferred embodiments of the invention, in which like reference characters refer to like parts throughout the several views, and in which:

FIG. 2A is a fragmentary longitudinal cross-sectional view of a simplified shift cycling portion of FIG. 2;

FIGS. 4 through 8 are lateral cross-sectional views respectively taken substantially on the lines 4—4, 5—5, 6—6, 7—7, and 8—8 of FIG. 1;

FIG. 9 is a longitudinal fragmentary cross-sectional view taken substantially on the line 9—9 of FIG. 1;

FIG. 10 is a fragmentary cross-sectional view taken substantially on the line 10—10 of FIG. 4;

FIG. 11 is a cross-sectional view taken substantially on the line 11—11 of FIG. 3;

FIG. 12 is a fragmentary cross-sectional view taken substantially on the line 12—12 of FIG. 1;

FIG. 13 is a fragmentary cross-sectional view taken substantially on the line 13—13 of FIG. 3;

FIG. 14 is a fragmentary cross-sectional view taken substantially on the line 14—14 of FIG. 1;

FIG. 15 is a fragmentary diagrammatic view of one preferred ratio alternater, taken from FIG. 7, with legends indicating functional characteristics;

FIG. 16 is a fragmentary cross-sectional view of a preferred zero-speed ratio alternater taken from FIG. 8, with legends indicating functional characteristics;

FIG. 17 is a fragmentary longitudinal cross-sectional view of another preferred ratio alternater;

FIG. 18 is a cross-sectional view taken substantially along the line 18—18 of FIG. 17, with legends indicating functional characteristics;

FIG. 19A is a fragmentary longitudinal cross-sectional view of another preferred zero-speed ratio alternater;

FIG. 19B is a cross-sectional view taken substantially along the line 19B—19B of FIG. 19A, with legends indicating functional characteristics;

FIG. 20A is a fragmentary longitudinal cross-sectional view of a further preferred zero-speed ratio alternater;

FIG. 20B is a cross-sectional view taken substantially along the line 20B—20B of FIG. 20A, with legends indicating functional characteristics;

FIG. 21 is an elevational view of a mechanical cycler element as seen from the line 21—21 of FIG. 2;

FIG. 22 is an electrical diagram of the preferred control circuits incorporated into the present transmission systems;

FIG. 22A is a diagram of pneumatic or hydraulic control circuits for use in the present transmission systems;

FIG. 23 is a cam groove development layout of a preferred shifter cam drum;

FIG. 24 is a diagrammatic plan view of another preferred transmission assembly incorporating the present invention with some portions shown in cross-section for clarity;

FIGS. 25 and 26 are fragmentary cross-sectional views taken substantially on the lines 25—25 and 26—26 of FIG. 24;

FIGS. 27, 28, 29 and 30 are fragmentary cross-sectional views of Geneva-gear type shifter cycling elements illustrating different operating positions, taken substantially on the line 27—27 of FIG. 24;

FIG. 31 is a diagrammatic plan view of yet another preferred transmission assembly incorporating the present invention;

FIG. 32 is a fragmentary cross-sectional view taken substantially on the line 32—32 of FIG. 31;

FIG. 33 is a fragmentary cross-sectional detail of a transfer gear bearing support of FIG. 31;

FIG. 34 is a fragmentary cross-sectional detail of another transfer gear bearing support of FIG. 31;

FIG. 35 is a diagrammatic plan view of still another preferred transmission embodying a further modification of my invention;

FIG. 36 is a diagrammatic plan view of yet another modification of the invention illustrating a geared positive clutch;

FIGS. 37 and 38 are fragmentary cross-sectional views taken respectively substantially on the lines 37—37 and 38—38 of either FIG. 36 or FIG. 42;

FIG. 39 is a fragmentary cross-sectional detail taken substantially on the section line 42—42 of FIG. 36;

FIGS. 40, 40A and 40B are respectively cross-sectional left face and right face views of a shifter cam disc used in the modifications of FIGS. 36 and 42;

FIG. 41 is a preferred basic electrical diagram for the devices of FIGS. 36 and 42;

FIG. 42 is a diagrammatic plan view of still another modification of the invention, illustrating a simplified dual-speed transmission device; and FIG. 43 is a block diagram of a device incorporating the devices of FIGS. 39 and 45 in one preferred combination.

DESCRIPTION OF PREFERRED EMBODIMENTS

Transmission system

Figure 1:
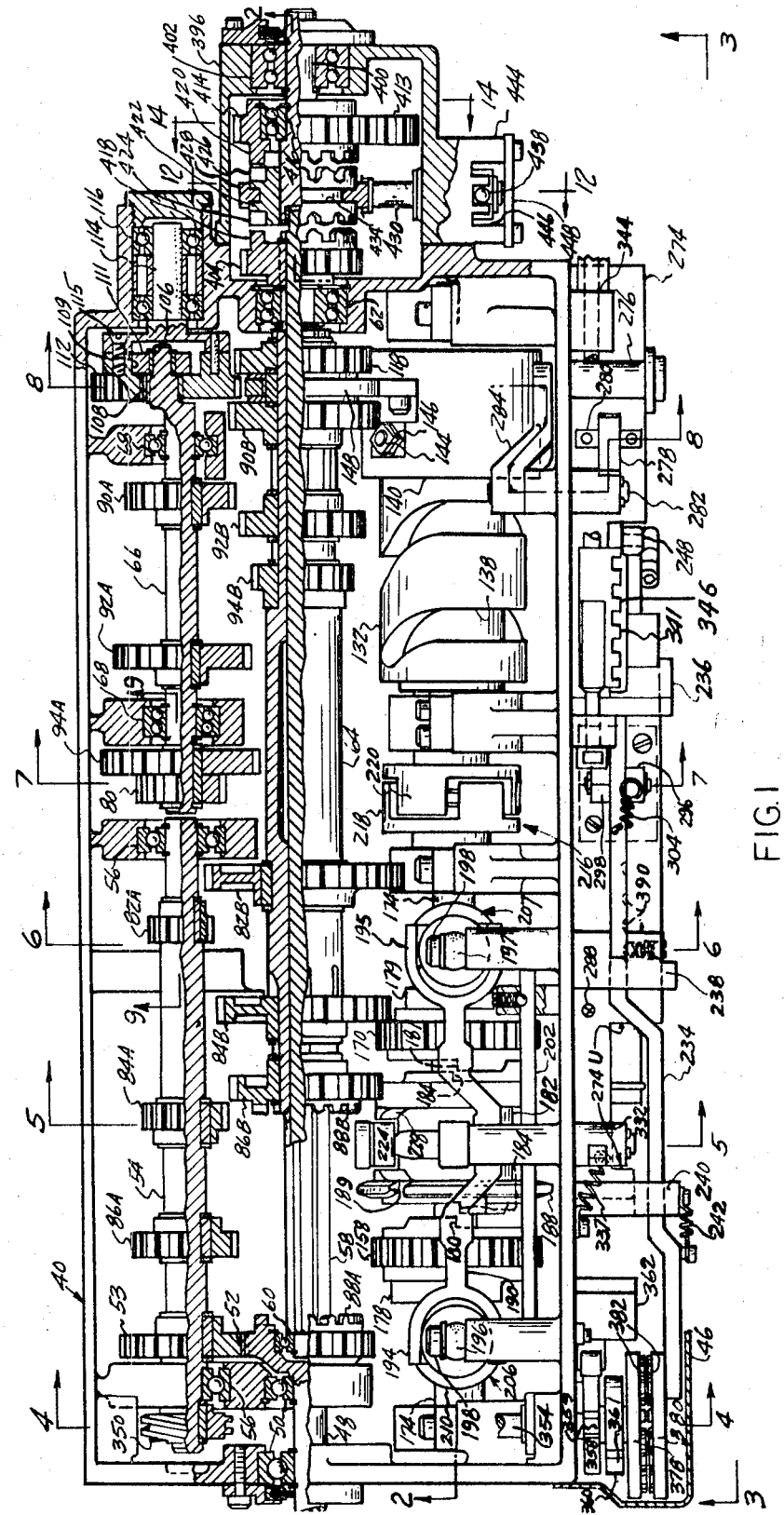
FIG. 1 is a top plan view of manual, semi- and fully-automatic transmission embodying my invention, shown in idle position with housing portions removed and some portions shown in cross-section for clarity.

Referring to the preferred continuous gear-mesh shifting transmission embodying the present invention and variations thereon, illustrated in FIGS. 1 through 23 and shown with controls particularly adaptable to automotive vehicle transmissions to incorporate fully automatic, semi-automatic, and manual shift selecting provisions, a four-sided transmission housing 40 is illustrated as having an open top and an open bottom closed oil-tight by covers 42 and 44 respectively, with the exteriorly located control elements enclosed by a control housing 46.

(A) Primary drive system.—(Note: the term "primary" in this and following descriptions is used to functionally distinguish the main driving gear train systems and associated components from other gearing.)

An input shaft 48 is rotatably mounted and carried by bearings 50 supported by the transmission housing 40, and carries on its inner end an input driver gear 52. A primary driver shaft 54 with its axis substantially parallel to the axis of the input shaft 48 is rotatably mounted in the transmission housing 40 by means of bearings 56 and is rotated by an input driven gear 53 constantly meshed with the input driver gear 52.

An output shaft 58 having substantially the same axis as the input shaft 48 is rotatably mounted at its forward end by a bearing 60 carried internally of the input driver gear 52, and at its rear end by a bearing 62 mounted in the rear end of the transmission housing 40. A driven shaft 64 is splined to the output shaft 58 for rotation therewith but is adapted for axial sliding movement with respect thereto.

The primary driver shaft 54 and the driven shaft 64 are provided with primary driver and driven gear pairs respectively to produce different input shaft 48 to output shaft 58 continuous driving speed ratios, when selectively engaged one at a time. In the preferred transmission shown, there are three selected primary driver gears 82A, 84A and 86A fixed for rotation with the primary driver shaft 54, and one direct drive primary driver gear 88A consisting of positive clutch interlocking teeth formed integral with the inner face of the input driver gear 52. These primary driver gears are selectively respectively engageable with primary driven gears 82B, 84B, 86B and direct drive primary driven gear 88B consisting of positive clutch mating interlocking teeth formed integral with said primary driven gear 86B, all being fixed for rotation with said driven shaft 64. Successive engagement of these primary gear trains is achieved when the driven shaft 64 is selectively shifted to the left from the idle position shown in FIG. 1, at such a time as the rotational velocities of the primary driven gears are positively substantially synchronized, successively one at a time, with their mated primary driver gears, as explained hereafter, to permit them to be slidingly shifted into positive synchronous gear-mesh engagement with proper alignment of their teeth. For convenience and clarity the above described gear pairs may be called respectively the first, second, third and direct-drive primary gear trains.

(B) Ratio alternater drive system. A ratio alternater output shaft 66 having its axis substantially parallel to the axis of the output shaft 58 is rotatably carried in the transmission housing 40 by means of bearings 68, and is continuously alternately accelerated and decelerated by a gear type radio alternater, illustrated in FIGS. 7, 9 and 15. The primary driver gear 82A, constantly drives a gear 76 fixed for rotation with an intermediate shaft 70, which is rotatably mounted in the transmission housing 40 by means of bearings 72 on an axis substantially parallel to the primary driver shaft 54 and ratio alternater output shaft 66. Ratio alternator driver and driven elements 78 and 80, being respectively fixed for rotation with the shafts 70 and 66, consist of two gears arranged to be in constant but varying effective driving radii gearmesh such that when the minimum radius of the ratio alternater driver element gear 78 is rotatably engaged with the maximum radius of the ratio alternater driven elemen gear 80, it is driven at a maximum gear ratio. As the gears rotate the gear ratio varies continuously, the effective radius of the driver element gear 78 increasing and the effective radius of the driven element gear 80 decreasing, toward a point at which the maximum radius of the driver element gear 78 engages the minimum radius of the driven element gear 80, when it is driven at a minimum gear ratio. Said gears are so constructed that while remaining in constant gear mesh the gear ratios in effect vary infinitely between selected maximum and minimum gear ratio values and between these values the ratio alternater output shaft 66 will be positively driven with alternating accelerating and decelerating rotation. The maximum and minimum gear ratio values are selected to be substantially proportional to the two gear ratios of every two successively operable primary driver gear trains heretofore described.

The ratio alternater output shaft 66 and the driven shaft 64 respectively carry ratio alternater driver and driven gears arranged for successive selective engagement between successive primary gear train engagements as the driven shaft 64 is moved axially to the left, from the idle position shown in FIG. 1, at such automatically shift cycled times, as the rotational velocities of the selected gear trains are positively driven into substantially synchronized rotation, to permit positively synchronous sliding shift engagement, by means to be described hereafter. These ratio alternater gear trains comprise ratio alternater drive gears 90A, 92A and 94A, all fixed for rotation with the ratio alternater output shaft 66, and adapted for selective engagement respectively with ratio alternater driven gears 90B, 92B and 94B, all fixed for rotation with the driven shaft 64. These ratio alternater gear trains may for convenience and clarity by termed first-to-second, second-to-third and third-to-direct ratio alternater gear trains, relating to their functional relationship with the previously characterized first, second, third and direct-drive primary gear trains.

FIG. 15 diagrammaticaly indicates the two selected maximum and minimum ratio values of the ratio alternater and also indicates a substantial angular cycle rotation before and after, during which the shifting actions can occur, where there are only substantially small variations from the minimum and maximum ratio values. Each positive shifting action can start from a selected angular rotation before and be completed at a selected angular rotation after the exact lines of the maximum and minimum ratio values depending on whether the shifting is started from a higher to lower, or from lower to higher ratios of the primary gear trains.

In operation, starting from a first speed shift point in which the first primary gear train 82A–82B is already engaged and driving the output shaft 58 at a relatively low speed (highest gear ratio) from the input shaft 48, with none of the ratio alternater gear trains engaged and at the angular rotational moment when the ratio alternater driver and driven element gears 78 and 80 have rotated the ratio alternater output shaft 66 substantially to the maximum gear ratio value, the ratio alternater driver gear 90A being driven thereby at its substantially minimum rotational velocity so as to be substantially positively synchronous with the rotational velocity of the first-to-second ratio alternater driven gear 90B, the driven shaft 64 may be selectively shifted by a positive "first shift action," explained hereafter, to the left from the position seen in FIG. 1, to slidingly synchronously engage the first-to-second ratio alternater driven gear 90B with its mating driver gear 90A, while simultaneously slidingly disenaging the first speed primary driven gear 82B from the primary driver gear 92A. A "second shift action" provides a shift dwell for the engaged ratio alternater driver and driven gears 90A and 90B during which the continuously decreasing ratio of the ratio alternater effects a driving acceleration of the ratio alternater gear train 90A–90B, accelerating the rotation of the driven shaft 64 and all gears fixed thereon as well as the output shaft 58, until such time as the accelerating rotational velocities of the second speed primary driven gear 84B becomes substantially synchronized with the primary driver gear 84A and with accurate tooth alignment, the ratio alternater having drivingly changed toward its minimum ratio value. At this moment an automatic "third shift action" will slidably synchronously shift the gears 84A and 84B into engagement and simultaneously slidably shift the ratio alternater driver and driven gears 90A and 90B out of engagement. The transmission is now driving in the second speed primary gear train, and the ratio alternater output shaft 66 is again running free with its accelerating-decelerating relative rotation, the entire shift cycle having been accomplished with no driving interruption and while constantly delivering full torque from input to output due to the fact that throughout shifting there is a "total" full width driving gear mesh as one driving gear train disengages while the next driving gear train engages.

At any time the ratio alternater gears 78, 80 again rotate to substantially the maximum gear ratio, at which angular moment the rotational velocities of the second-to-third ratio alternater driven and driver gears 92B and 92A become substantially the same, the driven shaft 64 may be shifted by another "first shift action" to slidingly synchronously engage this gear train while simultaneously shifting the second speed primary gear train 84B–84A out of engagement. A "second shift action" then provides a shift dwell for the engaged ratio alternater gears during the requisite rotation cycle to accelerate the third speed primary driven gear 86B to substantially the same rotational velocity as its mating third speed primary driver gear 86A, whereupon the driven shaft 64 will be again further automatically shifted by the continuous "third shift action" to simultaneously engage the third speed primary gear train 86A–86B and to simultaneously disengage the ratio alternater gear train 92B–92A, after which complete shifting cycle the transmission will be running at its constant driving third speed. The next "first shift action" may be selectively initiated when the ratio alternater gears 78, 80 are rotated again to substantially the maximum gear ratio position, at which moment the rotational velocity of the third-to-direct drive ratio alternater gears 94A and 94B become the same and may be shifted into gearmesh engagement while simultaneously disengaging the third speed primary gear train 86A–86B. Then during a "second shift action" shift dwell the ratio alternater again changes toward its minimum ratio value, until the rotational velocities of the direct drive primary gears 88B and 88A become substantially synchronized, at which moment the "third shift action" will automatically slidingly engage the direct drive gear train 88A–88B while simultaneously disengaging the ratio alternater gear train 94B–94A, whereupon the input shaft 48 is directly positively coupled in a straight in-line connection to the output shaft 58 for direct drive of the transmission.

Note that the axial spacings of all driver and driven gears are such that only one gear train at a time can be in full gear-mesh engagement, and that as one primary gear train is shifting out of engagement then one ratio alternater gear train is slidingly shifting into engagement, and similarly, as one ratio alternater gear train is shifting out of engagement then the next primary gear train is slidingly shifting into engagement, such that for the entire operating range of the transmission a continuous positive gear-mesh drive is maintained from the input shaft 48 to the output shaft 58, with applied full torque delivery even during shifting, since in total the effective full gear width of positively meshing gears is maintained at all times. Thus, when a ratio alternater gear train is shifted into full gear-mesh engagement the output shaft 58 is driven from the input shaft 48 through the ratio alternater, with torque applied therethrough, until the next primary gear train is shifted into gear-mesh engagement.

Other types of ratio alternaters may be used in place of the gear type ratio alternater of FIG. 15. All include the required positive driving type of ratio alternating driver and driven elements and functions. Such other variations will be described hereafter.

The foregoing description has dealt with the gear-shifting of the transmission at such times as the output shaft 58 is being positively and constantly gear driven, from the first speed primary gear train 82A–82B, through further gear trains and up to direct drive. In automotive transmissions particularly, as well as in other types of machinery, it is desirable to keep the input shaft rotating when the output shaft is idling or stopped. This necessitates a shifting from zero or idle output speed to the first primary gear train running speed and from first speed to zero or idle. The present invention incorporates a positive geared drive system to provide a continuous gear-mesh drive from zero to idle to a first speed, and vice-versa, also without the use of any type of frictional elements such as common clutches, brakes or the like, and one preferred gear driven positive clutch system is used in the embodiment of FIGS. 1 through 23, as follows:

The rear end of the ratio alternater output shaft 66 is provided with a stub shaft portion 106, with a second ratio alternater driver element gear 108 integrally formed thereon, as seen in FIGS. 1, 8 and 16, so that the pitch line center of one of its teeth coincides with the centerline of the ratio alternater output shaft 66. This second ratio alternater driver element gear 108 is engaged with an elongated internally toothed second ratio alternater driven element gear 110 provided in a second ratio alternater driver gear 112, which is secured by any means such as screws 115 to a second ratio alternater output shaft 114 rotatably supported in the transmission housing 40 by any means such as bearings 116. The shaft 114 is rotatable on an axis offset from and substantially parallel to the axis of the ratio alternater output shaft 66.

In operation, the second ratio alternater driver element gear 108 drives its driven element gear 110 with an alternating effective driving radii ratio, ranging from a selected minimum ratio value to a maximum ratio value which is at least high enough to effect a substantially zero-speed to the driven element gear 110, because the effective radius of the driver element gear 108 is substantially zero, and the effective radius of the driver element gear 108 is at a preselected maximum when its opposite tooth is rotated into gear-mesh engagement as seen in FIG. 16, so that the driven element gear 110 then is driven at a maximum velocity (minimum ratio). Between these maximum and minimum ratio values the ratio varies infinitely to produce the necessary acceleration and deceleration from and to zero output speed. FIG. 16 indicates the angular cycle rotations of the minimum and maximum velocity shifts (maximum and minimum ratio values respectively) during which the positive shifting occurs, at which times the ratio variation is for all practical purposes substantially small.

It will be noted that the second ratio alternater driver element gear 108, in the embodiment shown in FIGS. 1, 8 and 16, is rotated by the gear 80 of the first ratio alternater which in turn is operating at selected alternating minimum and maximum ratio values, which values and its angular cycling must be taken into account in selecting the gearing cycles of the second ratio alternater drive system since the ratio variations are cumulative.

A second ratio alternater driven gear 118 is fixed for rotation with the driven shaft 64 for selectively positively shifting into or out of gear-mesh engagement with the second ratio alternater driver gear 112 respectively from or to the idle position shown in FIG. 1. Driven shafts 64 shifting from zero speed proceeds leftwardly toward the first primary gear train position. This shifting is also mechanical and gear-synchronized, as will be explained hereafter, such that, when the second ratio alternater driver gear 112 is rotating at its substantially zero-speed position, a "first shift action" shifting movement of the driven shaft 64 to the left will effect a slidable engagement of the idling second ratio atlernater driven gear 118 with the then substantially zero speed driver gear 112; then a "second shift action" provides a shift dwell for the interval in which the second ratio alternater varies toward its minimum ratio value, thereby accelerating all of the driven gears with the driven shaft 64 and the output shaft 58, to a speed at which the rotational velocity of the first speed primary driven gear 82B becomes substantially synchronous with its mating primary driver gear 82A; then a "third shift action" is automatically effected to slidably engage the gears 82A, 82B while simultaneously disengaging the second ratio alternater driver and driven gears 112 and 118, at which time the transmission is running in its constant first speed position. From this first speed position onward through the other shifting ranges, operation proceeds as previously described.

The second ratio alternater driver gear 112 has an elongated recess forming an inner roller raceway 109 substantially concentric with the second ratio alternater driven element internal gear 110. The stub shaft 106 carries a roller 111 which rolls inside around the roller raceway 109 to retain the second ratio alternater driver element gear 108 in driving gear-mesh engagement at all times with the second ratio alternater driven element gear 110.

It will be noted that shifting to lower relative output speeds (i.e.: from direct drive to third, to second, to first speed and to idle) can be accomplished by reversing the above described operation, with the "first shift action" starting each shifting when the first ratio alternater or the second ratio alternater is functioning at substantially its selected minimum relative ratio value.

Other types of geared and also non-geared positive driving ratio alternater devices may be used in place of the gear type ratio alternaters heretofore described. Furthermore, the various ratio alternaters may be employed in other rotational transmitting devices having primary gear elements and positive shifting devices constructed according to my invention.

These ratio alternater devices function on the principle of rotatably changing the effective driving radii of the ratio alternate driver and driven elements while they remain in positive driving engagement, which results in an alternation of driver to driven element ratios with a substantially infinite variation between selected minimum and maximum ratio values. In some applications the ratio values required by the transmission may be such that one ratio alternater device will not be able to produce them efficiently, in which event two and even more ratio alternater devices may be employed in a series driving connection such as are the ratio alternaters shown in FIG. 1, or they may be employed in a parallel driving connection as in FIG. 35 to be described later.

Some non-geared types of positive driving ratio alternaters are shown diagrammatically as follows:

(1) FIGS. 19A and 19B illustrate a positive driving type ratio alternater for producing a required alternation between substantially zero and selected positive output speeds (maximum and minimum ratio values respectively). As shown, a crank 120 with an axially extending driver crank arm 122 and a stop finger 124, comprises the ratio alternater driver element fixed for rotation on a ratio alternater input shaft 66, which can be any positively driven shaft such as the ratio alternater output shaft 66 of FIG. 1. A driven cam member 126 comprises the ratio alternater driven element, fixed for rotation with a ratio alternater output shaft 114 which would be the ratio alternater output shaft 114 if this device replaced the one shown on FIGS. 1, 8 and 16. The driven cam member 126 is provided with three radially extending cam slots 128 substantially 120° apart, and three axially extending cam lugs 130, each one opposing one of the slots 128. The ratio alternater input and output shafts 66 and 114 are rotatably fixed to rotate on relatively parallel and offset axes, so that the driver crank arm 122 alternately engages in and disengages from successive cam slots 128 to intermittently rotate the cam member 126, while the lugs 130 alternately disengage from and engage with the stop finger 124 to hold the cam member 126 in stopped position when the driver crank arm 122 is not engaged in a cam slot 128. The substantially zero-speed or idle position is shown in solid lines in FIGS. 19A and 19B. As the shaft 66 rotates, the crank arm 122 moves toward and then into one of the slots 128, and simultaneously the stop finger 124 disengages from the cam lugs 130. At contact, the driver crank arm 122 will start to rotate the cam member 126 at a maximum driving radii (slowest cam member rotation), then with an accelerating cam member rotation to a point at which the driver crank arm 122 is driving at the radially innermost position in the slot 128 with minimum driven cam member radius as indicated by the phantom lines, providing the minimum driven radii (fastest cam member rotation). Continued rotation of the driver crank arm 122 will effect a decelerating rotation of the driven cam member 126, to a maximum driven cam member radius at disengagement as the stop finger 124 substantially simultaneously engages the cam lugs 130 to effect again a zero cam member speed (positive stop) while the driver crank arm 122 continues rotating without contact. The crank arm 122 has a large angular idle rotation (in the device shown, approximately 120°) from disengagement until effecting a similar engagement with the next slot 128 and simultaneous disengagement of the stop finger 124 from the lugs 130. A substantial angular rotation is also available before and after the indicated maximum rotational velocity (minimum radii ratio) position, during which there is a substantially insignificant change of driver to driven member radii ratio variation, and in which time the minimum ratio shift can be readily effected.

(2) FIGS. 17 and 18 illustrate another type of preferred positive driving ratio alternater device, operable to produce a required ratio alternation with substantially infinite ratio change between selected maximum and minimum ratio values, relative to the driver and driven element varying effective driving radii. In this embodiment a radially extending crank 98 and axially extending crank arm 100, comprising the ratio alternater driver element, are illustrated as being fixed for rotation with a ratio alternater input shaft 54 which shaft can be any positively driven shaft of a transmission, for example the extended primary driver shaft 54 of FIG. 1. The crank arm 100 positively engages in a substantially radially extending slot 102 of a driven arm 104, comprising the ratio alternater driven element, fixed for rotation with a ratio alternater output shaft 66, which shaft can be the ratio alternater output shaft 66 of FIG. 1. The shafts 54 and 66 are rotatably fixed with substantially parallel offset axes relative to each other, and as the driver crank arm 100 rotates the driven slotted arm 104, the crank arm 100 having a fixed radius as indicated by the circle A of FIG. 18, rides radially from an outermost to an innermost position in the slot 102 effecting an alternately infinitely varying driver and driven radii ratio between selected minimum and maximum ratio values. As the crank arm 100 rotates clockwise along the phantom line A, starting from its solid line position which is the maximum radii ratio position, acceleration of the driven element occurs for 180° of the rotation, at which moment the crank arm 100 is driving the driven arm 104 at the minimum radii ratio (maximum speed) position. Continuing for the next 180° of rotation, deceleration of the driven arm 104 will occur. It will also be observed that a substantial angular rotation is available before and after the maximum and minimum radii ratio position, during which there is a substantially small variation of the effective driver to driven element radii ratio, when the positive shifting can be readily accomplished.

(3) Another type of positive driving ratio alternater device is illustrated in FIGS. 20A and 20B, to produce a required relative ratio alternater with substantially infinitely varied driving radii ratio change between selected maximum and minimum ratio values. In this embodiment a ratio alternater driver element arm 131 having a substantially radially extending slot 131A and fixed for rotation with a ratio alternater input shaft 66, is positively drivingly connected with a driven crank arm 131B of a ratio alternater output shaft 114. The ratio alternater input shaft 66 and the ratio alternater output shaft 114 are rotatably fixed on substantially parallel offset axes relative to each other. In the position of the driver arm 131 and driven crank 131C shown by solid lines in FIG. 20B, the driven crank 131C is driven at its minimum rotational velocity (maximum driver and driven ratio value). The driver arm effective radius from this point will become larger with infinite variation as the crank arm 131B moves outwardly in the slot 131A until a maximum rotational velocity (minimum ratio value) is effected. For a substantial angular rotation before and after the maximum and minimum ratio values, indicates as minimum and maximum velocity shift in FIG. 20B, there are substantially small variations of the effective maximum and minimum radii ratios, during which periods positive shifting can be accomplished. The phantom lines in FIG. 20B show both the driver arm 131 and driven crank 131C in an interim position as they rotate, then being at about equal radii to effect substantially a one-to-one ratio.

Figure 2:
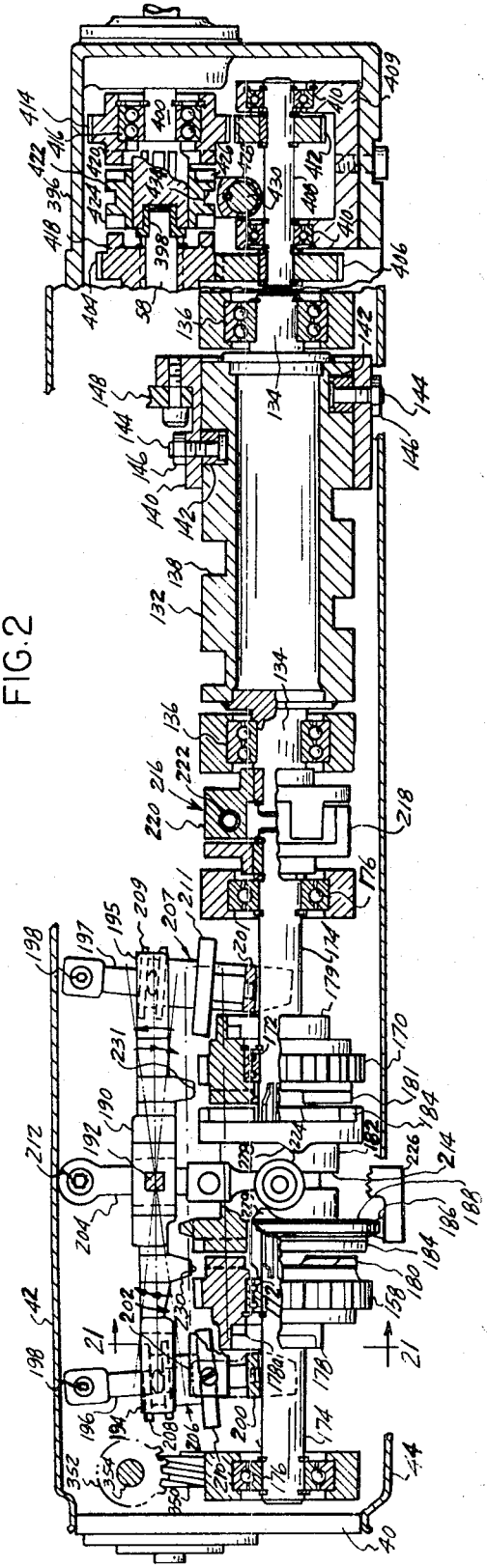
FIG. 2 is a longitudinal cross-sectional view taken substantially on the line 2—2 of FIG. 1.

(C) Positively driven permanently synchronized automatic mechanical shifting mechanism.—The first, second and third shift actions previously referred to effect one complete shift cycle, using a positively driven, permanently synchronized cycling, fully automatic mechanical shifter device, with manual, semi-automatic and full-automatic shift selection, in the preferred embodiment illustrated in its principal components in FIGS. 1 through 8, 21 and 23. As shown, a shifter cam drum 132 is mounted on a cam shaft 134 which is rotatably supported in the transmission housing 40 by means of bearings 136 or the like on an axis substantially parallel to the axis of the output shaft 58. The shifter cam drum 132 has a substantially helically disposed cam groove 138 which is shown in a development layout in FIG. 23. For each 180° of one complete shift cycle the cam groove has a first portion sloped relative to a plane passing normally through the drum 132 to effect the "first shift action," a second non-sloped portion to effect the "second shift action" or "dwell," and a third sloped portion to effect the "third shift action." A cylindrical sleeve 140 is axially slidably supported around the drum 132 and carries a pair of cam rollers 142 by means of studs 144 and nuts 146. The cam rollers 142 are spaced 180° apart and relatively axially spaced to engage the cam groove 138 on opposite sides of the drum 132 as indicated in FIGS. 2 and 23. A shifter arm 148 is secured to the sleeve 140 to connect it with the axially shiftable rotatably driven shaft 64 between the gears 118 and 90B as shown in FIGS. 1 and 8. In this arrangement, when the shifter cam drum 132 rotates in either direction, the first sloped portions of opposite sides of the cam groove 138 will drive the rollers 142 and the sleeve 140 axially in a related direction, shifting the driven shaft 64 to effect the "first shift action" previously described. As the shifter drum 132 continues to rotate, the rollers 142 next move into the non-sloped portions of the cam groove 138, where the rollers 142 are held against any axial movement, and the driven shaft 64 thereby is retained in fixed position on the output shaft 58 effecting the "second shift action" or shift dwell. With further continuous rotation of the cam drum 132 the rollers are again engaged by sloped portions of the cam groove 138 to further drive the rollers 142 and sleeve 140 axially to shift the driven shaft 64 the required distance to effect the "third shift action" and complete one shift cycle, after which the shifter cam drum 132 is stopped and the cam groove 138 holds the cam rollers 142 with the sleeve 140 and the driven shaft 64 in the next shifted position. Each complete shift cycle may be repeated as required. One directional rotation of the shifter cam drum 132 effects and repeats the first, second and third shift actions in one direction which, if to the left as seen in FIG. 1, shifts the transmission from zero output speed to first, second, third and direct drive, and it is readily apparent that the opposite directional rotation of the shifter cam drum 132 will effect an opposite axial directional shifting of the driven shaft 64, shifting the transmission from direct drive toward zero speed of the output shaft 58.

If additional speed ranges are desired, then the shifter cam drum 132 will be provided with further extensions of the cam groove 138, the ratio alternater shaft 66 will be extended to provide additional ratio alternater driver gears, the primary driver shaft 54 will be extended to provide additional primary driver gears, and the driven shaft 64 will be extended to provide additional primary and ratio alternater driven gears.

For cycling the shifter cam drum 132 each 180°, or one-half revolution, in synchronous and proportional rotation with respect to the ratio alternater functions, a permanently synchronized selectively actuated automatic cycling mechanism is incorporated in this embodiment of the invention as illustrated primarily in FIGS. 1, 2, 4–7 and 10 In the following description, "clockwise" and "counterclockwise" rotations refer to the rotation of components as seen from the front or input shaft 48 side of the transmission (from the left of FIG. 1). For explanatory purposes, the input shaft 48 is considered to be continuously driven with a clockwise rotation.

As shown in FIGS. 4 and 10 the previously described input driver gear 52 is arranged for constant positive gear-mesh engagement with an idler gear 150 fixed for rotation with an idler shaft 152 carried by bearings 154 or the like in a bearing support 155 bolted to the transmission housing 40. A shifter driver gear 156 and a pinion gear 160 are also fixed for rotation with the idler shaft 152, and the pinion gear is drivingly engaged with a reversing idler gear 162 fixed for rotation with an idler reversing shaft 164 rotatably carried by bearings 166 or the like in the bearing support 155. The shaft 164 also carries for rotation therewith a shifter reverse driver gear 168. A clockwise shift driver gear 158 and a counterclockwise shift driver gear 170, as seen in FIG. 2, are carried for independent rotation on individual bearings 172 mounted on a cam shaft 174, which is rotatably carried in the transmission housing by means of bearings 176. The clockwise shift driver gear 158 is driven constantly clockwise by the shifter driver gear 156, and the counterclockwise shift driver gear 170 is driven constantly counterclockwise by the shifter reverse driver gear 168, both having the same proportional constant rotation relative to the rotation of the previously described ratio alternaters.

The outwardly facing sides of the clockwise and counterclockwise shift driver gears 158 and 170 respectively have spiral axially projecting flanges 178 and 179 respectively, and the inwardly facing sides have two 180° separated axially extending substantially radially disposed positive coupling teeth 180 and 181 respectively. A shifter cone 182 is splined for rotation with the cam shaft 174 and for free axial movement thereon between the shift driver gears 158 and 170. Both outer faces of the shifter cone 182 are provided with two positive coupling teeth 184 for alternative positive engagement with the coupling teeth 180 and 181 of shift driver gears 158 and 170, when moved into alternative engagement therewith, effecting either a clockwise or a counterclockwise driving rotation of the cam shaft 174. The shifter cone 182 has an intermediate disengaged position where it is retained in a stationary nonrotating position by means of a stop tooth 186 engaging in either one of two 180° separated stop slots 189 provided in a radially extending flange 188 formed integrally with the shifter cone 182, the stop tooth 186 being fixed to the transmission housing 40. Thus, in the intermediate or "neutral" position of the shifter cone 182, the shifter cam shaft 174 will be positively held in a stationary position.

A signal arm member 190, shown in FIGS. 1, 2 and 5, is secured to a shaft 192 rotatably supported by the transmission housing 40. The signal arm 190 is provided at its ends with forks 194 and 195.

In FIGS. 1, 2, 5 and 6 two shift roller arms 196 and 197 are shown as pivotally supported at their upper ends by screws 198 secured to the transmission housing 40, and guide elements 200 and 201 embracing the shift cam shaft 174 are provided on the lower ends of the arms 196 and 197. A connecting bar 202 connecting the guide elements 200 and 201 is provided to tie the two shift roller arms 196 and 197 together and to a shifting fork 204 by a bolt 205, as seen in FIG. 5, for common movement. The upper end of the shifting fork 204 is also pivotably fixed to the housing 40 by means of at bolt 212, and the lower end engages in a peripheral groove 214 of the shifter cone 182.

Shift roller members 206 and 207 are axially slidable and rotatable on the shift roller arms 196 and 197 respectively. The arms 196 and 197 have upper guide spool portions 208 and 209 engaged with the ends of the signal arm forks 194 and 195 respectively, and lower shift rollers 210 or 211. As one end of the signal arm 190 or the other is tilted toward the cam shaft 174, the roller 210 or 211 will be pushed into mechanically cycled engagement, first to roll above and then engage beneath the flange 178 or 179, respectively.

The inner end of the cam shaft 174 is coupled with the end of the cam shaft 134 by a spring loaded jaw type positive coupling device 216. A triple-jawed driver coupling 218 is fixed for rotation with the cam shaft 174, as shown in FIGS. 1, 2 and 7, and is connected by means of compression springs 222 with a mating driven coupling 220 fixed for rotation with the cam shaft 134. The camshaft 174 is thus adapted to rotate the cam shaft 134 through the spring-loaded but positive coupling 216.

The shift cycling mechanism described above operates to rotate the shifter cam drum 132 through the previously described 180° rotation of each complete shift cycle in either a clockwise or counterclockwise direction in the following fashion:

The signal arm 190 is tilted in one or the other direction by the rotation of the shaft element 192 when actuated by synchronized controls and a solenoid actuator to be described. When the fork 194 of the signal arm 190 is actuated downwardly toward the cam shaft 174, it moves the shift roller member 206 downward also causing the shift roller 210 to contact and roll on the outer periphery of the clockwise rotating spiral flange 178 of the clockwise rotating shift driver gear 158, between the positions A and B shown in FIG. 21, and then to ride underneath the flange 178, from the position B to position C, whereupon the shift roller 210 will be pushed axially away from the shift driver gear 158 to ride onto an axially outwardly rising cam surface 178a between positions C and D of FIG. 21. This pivots the arm 196 with its connecting bar 202 and shifting fork 204 to the left away from the driver gear 158, thereby axially shifting the shifter cone 182 toward the shift drive gear 158 and disengaging it from the top tooth 186, effecting engagement of the coupling teeth 180 and 184 to start rotating the cam shafts 174 and 134 and hence the shifter cam drum 132 in a clockwise direction. The cam surface 178a is so located relative to the coupling teeth positions to start the aforesaid shifter cam drum rotation at that moment in which the first ratio alternater is substantially at its maximum ratio value, and when the second ratio alternater driven gear 110 is substantially at zero driven element speed (maximum radii ratio). Clockwise rotation of the shifter cam drum 132 starts the first shift action, with continuation through the second and third shift actions, effecting the previously described axial shift, dwell, and final shift of the driven shaft 64.

Near completion of the 180° revolution of the cam drum 132, a projection 230, extending downward from the signal arm 190, engages the angularly finished outer surface of the positive coupling teeth 184 of the shifter cone 182, pushing the arm 190 upwardly to return it to its neutral position, shown in solid lines in FIG. 2, so that the fork 194 will raise the shift roller member 206 within the arcuate space indicated at F in FIG. 21. While the signal arm 190 and roller 206 return to their neutral positions, two return rollers 224, mounted 180° apart on a bracket 226 fixed to the housing 40 (FIG. 5), will engage with two inwardly facing cam elements 228 near the midportion of the shifter cone 182 and also positioned 180° apart, to push the shifter cone 182 back to its neutral position, while one of the two 180° separated stop slots 189 of the flange 188 again slidably engages the stop tooth 186, thereby securing the shifter cone 182 and cam shaft 174 in the stopped position. The cycling mechanism is thus returned to its "neutral" position in readiness for another synchronized cycling operation, when desired.

Actuation of the cycling mechanism for counterclockwise rotation of the shifter cam drum 132 to shift the driven shaft 64 from higher to lower speed gears will be effected in a similar fashion as for the clockwise operation thus described, but with opposite functions, starting with downward tilting of the fork 195 of the signal arm 190, to move the shift roller 207 downward to contact the flange 179 of the counterclockwise driven shift driver gear 170. The roller 207 rides under the flange 179 and engages a cam surface similar to the cam surface 178a to pivot the arm 197 to the right, axially shifting the shifter cone to engage the coupling teeth 181 and 184 to start rotating the cam shafts 174 and 134, and hence the shifter cam drum 132, in a counterclockwise direction. After completion of a 180° counterclockwise revolution of the shifter mechanism, a downwardly extending projection 231 of the signal arm 190 engages the angularly finished outer surface of the coupling teeth 184 of the shifter cone 182 to push the signal arm 190 upward to its neutral position, while the return rollers 224 engage cam elements 229 of the shifter cone member 182 to push it back to its neutral position, while the stop slot 189 slides into mesh with the stop tooth 186.

FIG. 2A illustrates a simplified cycling mechanism which may be used instead of the mechanical shift cycle mechanism just described, as shown mainly in FIG. 2. Components common to both FIGS. 2 and 2A are referred to by the same reference characters. In the simplified cycling device of FIG. 2A, the shift signal shaft 192 directly carries a shifter fork 204a and shifts the shifter cone 182 directly to engage either a clockwise shifter gear 159 or a counterclockwise shifter gear 171 by means of their positive coupling teeth 180, 181, 184 at the synchronous angular rotation time as previously described. It can be seen that both of the shift cycling mechanisms, either that shown in FIG. 2 or the simplified system shown in FIG. 2A, can be arranged for a substantially 360° of cycle rotation, if required, together with the cam groove 138 of said shifter cam drum 132.

(D) Permanently synchronized shift signal control system.—The described clockwise or counterclockwise cycling rotations of the cam shaft 174 are initiated by a positively driven, permanently synchronized shift signal control system which is illustrated primarily in FIGS. 1, 3–8 and 11, and in the electrical control system diagram of FIG. 22 or in the fluid control system diagram of FIG. 22A.

The mechanics of the control system herein may appear complicated, however the main purpose of the disclosure is to indicate the adaptability of this invention to applications having manual, semi- and full-automatic speed selection for the automatic mechanical shiftings.

Figure 3:
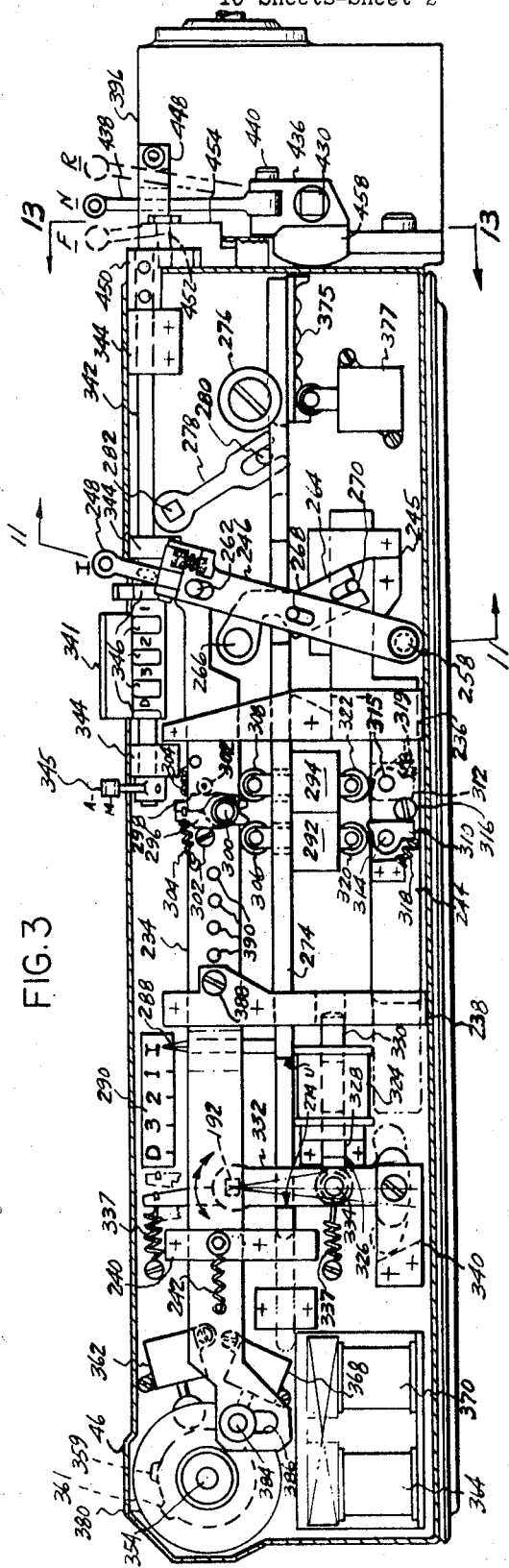
FIG. 3 is a side elevational view with the control cover removed for clarity, as seen substantially from the line 3—3 of FIG. 1.

An upper shift bar 234 is supported for longitudinal sliding motion by brackets 236, 238 and 240 or the like, mounted on the side of the transmission housing 40. The upper shift bar 234 is forced toward the right as seen in FIG. 3 by any means such as a tension spring 242 connected to the bracket 240 as shown. A lower shift bar 244 is also supported for longitudinal sliding movement by the brackets 236, 238 and 245. A speed control arm 246, having a handle 248 on its upper end, is shown primarily in FIGS. 3 and 11. The speed control handle 248 is pivotally secured to the speed control arm 246 by a pin 250 and is biased by means of a compression spring 256 interposed between a flange 252 of the handle 248 and a flange 254 of the speed control arm 246 to force the handle 248 to the upright position shown in FIG. 11. The speed control arm 246 is pivotally mounted on the transmission housing 40 by means of a bolt 258 and nut 260 or the like, and when pivotally moved by the handle 248 will simultaneously longitudinally actuate the upper and lower shift bars 234 and 244 respectively by a locater pin 262 connecting the speed control arm 246 with the upper shift bar 234, and a linkage member 264 pivotally secured to the transmission housing 40 by a bolt 266, and connected with the speed control arm 246 by a pin 268 and with the lower shift bar 244 by a pin 270, as shown in FIGS. 3 and 11.

A shift position signal bar 274 is longitudinally slidably supported by the brackets 236, 238, 240 and a roller 276, disposed intermediate the upper and lower shift bars 234 and 244. The signal bar 274 is movable longitudinally by means of a shift position lever 278 by a pin 280 secured to the shift position signal bar 274. The shift position lever 278 is fixed for rotation with a shaft 282 and for actuation by a shift actuated lever 284 located on the interior of the transmission housing 40, as seen in FIGS. 1 and 8. The shift actuated lever 284 has a forked lower end to engage with a lug 286 extending from the sleeve 140. In operation, as the shifter cam drum 132 is cyclingly rotated to shift the sleeve 140 and the driven shaft 64 from one primary gear train to the next, the shift position signal bar 274 will be actuated to slide longitudinally by means of the levers 284 and 278. A speed indicator pointer 288 secured to and upstanding from the signal bar 274 as shown in FIG. 3 indicates visually on an indicia plate 290 the primary gear train in which the transmission is operating. Naturally, an indicia plate and a pointer actuated from the shift position bar 274 can be located remote from the transmission as on a vehicle instrument panel.

Two mechanically interconnected start-stop switches 292 and 294 of the two-position on-off snap action type, disposed in a common casing, are mounted on and carried by the shift position signal bar 274 as shown in FIGS. 3 and 7. A pair of switch fingers 296 and 298 are pivotally carried by means of a pin 300 on the upper shift bar 234, and are forced into their normal positions against stop elements 302 by means of springs 304. From the position shown in FIG. 3, when the upper shift bar 234 is moved to the left by the shift selector arm 246 to start a shifting cycle, the switch finger 296 engages a roller 306 on the upper shaft end of the switch 292 and will push it downward to close the contacts and set the electrical control circuit in readiness to receive the cycle time start signal, to be explained hereafter, to start the synchronized mechanical shifting of the transmission into higher output speed gears. Moving the upper shift bar member 234 to the right, from a higher speed gear position leftward of that shown in FIG. 3, causes the finger 298 to engage a roller 308 on the upper shaft end of the switch 294 and push it downward to close the electrical control circuit in readiness to receive the cycle time start signal, to be explained hereafter, to start the shifting of the transmission into lower output speed gears. It will be noted that the switch fingers 296 and 298 are arranged to actuate the respective start-stop switches only as they move in the directions noted, and the fingers 296 and 298 will ride freely over the rollers 306 and 308 when the start-stop switches 292 and 298 are later moved in the other direction by the shift position signal bar 274. A pair of similar type of switch fingers 310 and 312 are pivotally carried one on each side of the lower shift bar 244 by means of pins 314 and 315 respectively, and are forced against a common intermediate stop element 316 by means of compression springs 318 and 319. When the lower shift bar 244 moves to the left of the position shown in FIG. 3, the finger 310 rides free under a roller 320 on the lower shaft end of the switch 292, but when the shift signal bar 274 thereafter moves the switch 292 with its roller 320 to the left while the transmission is shifing to a higher speed gear, the finger 310 is held against pivoting and will push the roller 320 upward to disconnect the contacts of the switch 292, thereby deenergizing the electrical control circuit for that shifting cycle. In like fashion, when the lower shift bar member 244 moves to the right, from a position leftward of that in FIG. 3, the finger 312 rides free under a roller 322 of the switch 294, but when the shift signal bar 274 thereafter moves to the right while the transmission is shifting to a lower gear, it moves the roller 322 of the switch 294 against the finger 312 to engage and push the roller 322 upward, disconnecting the contacts of the switch 294, thereby disconnecting the electrical control circuit for that slower output speed shifting cycle.

A direct current actuator solenoid 324, mounted on the transmission housing 40, comprises a central core member 326 axially movable within the solenoid coil and having permanent magnet elements 328 and 330 at each end, their polarity arranged so that one or the other will be moved inwardly as determined by the polarity of the direct current actuator solenoid when energized, as respectively indicated by the single and double directional arrows in FIG. 3 and in the circuit of FIG. 22. One end of the core 326 is pivotally secured to an actuator lever 332 by means of a pin 334 as shown in FIGS. 3 and 5. The lever 332 is secured to the signal shaft 192, previously described, extending from the interior of the transmission. A detent 336 is provided at the lower end of the lever 332 as seen in FIG. 5 to be located by spring loaded ball 338 carried in a bracket 340, and two balancing tension springs 337 attached between the lever 332 and the transmission housing 40 tend to retain the lever 332 in an intermediate or neutral position when the actuator solenoid 324 is not energized, thereby also maintaining the signal arm 190 on the other end of the signal shaft 192 in the horizontal or intermediate neutral position.

FIGS. 1 and 3 show, adjacent to the shift selector arm handle 248, a shift selector drum 341 fixed for rotation with a shaft 342 rotatably mounted by brackets 344 on the transmission housing 40. The forward end of the shaft 342 has secured for rotation therewith a shift selector handle 345 shown in the manual M position in FIG. 13. The shift selector drum 340 has a series of spaced teeth 346 shown in FIGS. 1, 3 and 11, which will enable a finger 348 formed integrally with the handle 248 to be selectively located by pivoting the handle 248 outwardly and then moving it forward to set the finger 348 in one or the other of the spaces between the teeth 346. The number of spaces between the teeth 346 are equal to the number of the primary gear train speed positions, including idle I, into which the transmission may be shifted.

A positively driven permanently synchronized signal device is shown primarily in FIGS. 1, 3 and 4 and the electrical diagram of FIG. 22, and comprises a worm 350 fixed for rotation with the primary driver shaft 54 to drive a worm gear 352 fixed for rotation with a signal driver shaft 354 rotatably mounted by bearings 356 in the two sides of the transmission housing 40, with one end extending outside to carry for rotation therewith a pair of signal cams 358 and 360. The shift signal driver shaft 354 is rotated with a constant proportional rotation relative to the rotation of the ratio alternater and the shifter driver gears 158 and 170.

A cam lobe 359 of the cam 358 is prepositioned to rotatably engage and actuate the roller of a clockwise shift start timing limit switch 362 in synchronized rotational angular time relation with the actuation of the cycling device for clockwise rotation of the cam shaft 174. When the clockwise start-stop switch 292 is selectively actuated to close its contacts, actuation of the shift start limit switch 362 will energize a clockwise circuit relay 364, closing normally open memory contacts 366 and thereby holding that circuit while energizing the solenoid 324 to tilt the shifter arm 190 and start the previously described synchronized mechanical shifting cycle for clockwise cycled rotation of the shifter cam drum 132 to effect shifting to a higher output speed. Energizing the clockwise relay 364 also opens normally closed contacts 374 of the counterclockwise electrical circuit, which is thereby rendered inoperative. The clockwise circuit relay 364 is also mechanically interlocked with a counterclockwise circuit relay 370 so that only one at a time can be operated.

A cam lobe 361 of the cam 360 is similarly prepositioned to engage and actuate the roller of a counterclockwise shift start timing limit switch 368 in synchronized rotational angular time relation with the actuation of the cycling device for counterclockwise cycling. When the speed control arm 246 is moved one step from a higher to a lower speed position, the counterclockwise start-stop switch 294 will be actuated to close its contacts. Actuation of the counterclockwise shift start timing limit switch 368 will then energize the relay 370, closing its normally open memory contacts 372, holding that circuit energized, while energizing the solenoid 324 with opposite polarity to start the synchronized mechanical shifting for the counterclockwise cycled rotation of the shifter cam drum 132 to effect shifting to a lower output speed as previously described. When the relay 370 becomes energized it also opens its normally closed contacts 376 of the clockwise control circuit.

As the shift position signal bar 274 moves with the shifting of the shift actuator sleeve 140 one tooth of a toothed cam element 375 fixed to signal bar 274, as shown in FIG. 3, will engage the roller of a normally closed spring return type safety limit switch 377 mounted on the transmission housing 40, to disconnect both electrical circuits from the power source, and return either energized circuit to a deenergized condition before the next shifting cycle can be initiated.

Manual selection shifting is accomplished when desired by moving the speed control arm handle 248 into the first position, and after the shift cycle is completed into the second, and so on into the third and fourth positions.

To effect semi-automatic operation, the shift selector handle 345 remains in the manual M position, and the speed control arm handle 248 may be moved from idle immediately into any desired position. With the first movement of the handle 248 to pivot the speed control arm 246, moving both the upper and lower shift bars 234 and 244 toward the left as seen in FIG. 3, the finger 296 on the upper shift bar 234 will push the roller 306 downward, closing the switch 292 contacts. When the cam lobe 359 then actuates the clockwise limit switch 362, the solenoid 324 is energized to pull its core magnet element 328 inward to pivot the actuator lever 332 in the direction shown by the single arrow and thus rotate the shaft element 192 and signal arm 190, thereby moving its fork 194 downward to initiate the previously described shifter cone and gear engagement for rotating the shifter cam drum 132 clockwise to start one completed cycled shifting, into a higher speed drive of the transmission. While this shift cycle is operating to completion, the safety limit switch 377 will be actuated to deenergize the electrical circuit and the solenoid 324, allowing the signal arm 190 to return to its neutral position, but as soon as the shift start timing limit switch 362 is again actuated by the continuously rotating cam lobe 359, the circuit to the solenoid 324 will be closed again, operating the lever 332 and tilting the signal arm 190 to initiate another complete mechanical shift cycle. This cycling will be repeated until completion of the last shift cycle dependent upon the position in which the speed control arm 246 has been set, after which the cycling system remains deenergized. The rotational time involved in the semi-automatic selective shifting operation from one primary gear speed to another is effected in the shortest cycling time regardless of speed involved. It may be noted that among the safety features incorporated in this transmission is the cut-out 274–U (FIGS. 1 and 3) of the shift position signal bar 274, which cut-out at one side stops the actuator lever 232 from pivoting to start mechanical shifting to higher output speed when the signal bar 274 has already arrived at the highest speed or direct drive position, and at the other side it stops the actuator lever 332 from pivoting to start shifting to slower output speed when the signal bar 274 is already at its idle I or declutched position.

For semi-automatic shifting to lower ouptut speed position, that is, to higher gear ratios, the handle 248 may be moved more than one step from one of the higher speed positions to a lower speed position, for example from direct drive to idle speed. The semi-automatic shiftings will then be effected within the shortest possible mechanical shift cycle intervals, completing each electrically and automatically initiated shifting cycle from step to step downward with the same operations previously described for single step manual shifting, until the last shifting step is completed, at which time the counterclockwise shift control circuit becomes and remains deenergized at that position to which the speed control arm 246 has been moved.

For full automatic shifting operations to higher and lower output speed gears, the shift selector handle 345 will be moved upward to the dotted line position A indicating "automatic" as seen in FIGS. 3 and 13, moving the shift selector drum teeth 346 upwardly from engagement with the finger 348 of the handle 248. This will permit the speed control arm 246 to be moved freely in either direction by an automatic shifting mechanism to be described. The automatic movement of the handle 248 may be produced by any desired means responsive to speed, such as the arrangement shown which is driven by the input shaft 48.

A pair of permanent magnet-drag driver and driven discs 378 and 380 respectively are carried on the outer end of the signal driver shaft 354. The inner or magnet-drag driver disc 378 is fixed for rotation with the signal driver shaft 354, while the outer or magnet-drag driven disc 380 is carried on but is freely rotatable with respect to the signal driver shaft 354. The opposing faces of the magnet-drag discs 378 and 380 have clearance therebetween and both carry angularly spaced permanent magnet elements 382 arranged for attraction to each other. The outer magnet-drag disc 380 carries a pin 384 which is engaged with a slot 386 provided in the forward end of the upper shift bar 234, as shown in FIGS. 3 and 4.

It can be seen that the rotation of the magnet-drag driver disc 378 will tend to rotate the magnet-drag driven disc 380 with a magnetic traction force which is proportional to the rotational speed at which the input shaft 48 is rotating, to tend to move the upper shift bar 234 and the speed control arm 246 to the left against the force of the spring 242 and also against the retention force exerted by a spring loaded ball check element 388 engaged in one or the other of a set of detents 390, one being provided for each shift position of the upper shift bar 234 as shown in FIGS. 1, 3 and 6. The spring loaded ball check 388 is carried in the bracket 238. Thus, the driven disc 380 will apply a force relative to the rotational speed of the input shaft 48 as it increases, to move the upper shift bar 234 an extent necessary to locate it in the next higher transmission speed shift position retained by one of the ball detents 390 to initiate the appropriate shift cycle to higher speed gearing. When the input shaft 48 rotation decreases, the magnet-drag force on the driven disc 380 becomes less and when the spring 242 force overcomes that magnet-drag force the upper shift bar 234 will be pulled to the next lower speed position, initiating the appropriate shift cycle to lower speed gearing. The electrical signal and mechanically synchronized gear shifting operations to higher and lower speed gears will function in the same manner as previously described for manual and semi-automatic shifting operations.

In the foregoing description, the control system is electrical. However, mechanically operated pneumatic or hydraulic control systems can be used also when desired, and one such basic control system is illustrated diagrammatically in FIG. 22A. A double acting actuator cylinder 325 with piston 329, which may be pivotally connected to the actuator lever 332 as and replacing the actuator solenoid 324, actuates either the shifter cycling device shown in FIGS. 1–23 or that shown in FIG. 2A, or directly actuates the shiftable gear or gears of a transmission. Valve 293 with rollers 307 and 321 and valve 295 with rollers 309 and 323 are arranged to be opened and closed to operate similarly to the start-stop switches 292, 294 with rollers 306, 308, 320 and 322 as shown in FIGS. 3 and 22. Two spring return type shift start timing valves 363 and 369 are arranged to be opened by the cam elements 358 and 360 and operate in the same manner as the shift starting timing limit switches 362 and 368 respectively to provide selective opening of the hydraulic or pneumatic circuit to one or the other side of the piston 329, providing automatic synchronous time cycled actuations to start shifting in one or the other direction.

The present preferred transmission, whose control system is arranged primarily for automotive application, may require a manually operated forward-neutral-reverse drive mechanism. One preferred arrangement is shown principally in FIGS. 1–3 and 12–14.

The reversing mechanism is contained in a reversing gear housing 396 secured to the rear end of the transmission housing 40. The output shaft 58 extends into the reversing gear housing 396 and locates in axial alignment by means of a bushing 398 the inner end of an output driving shaft 400, rotatably mounted in the housing 396 by any means such as bearing 402. A forward drive gear 404 is fixed for rotation with the output shaft 58 and is drivingly engaged with a reverse gear 406, which is fixed for rotation with a reverse idler shaft 408, rotatably mounted in a bearing support 409 in the housing 396 by bearings 410 or the like. A reverse drive gear 412 is fixed for rotation with the reverse idler shaft 408, and is drivingly engaged with a reverse pinion 413 carried on a shaft 415 by bearings 417 in the support 409. The reverse pinion 413 is drivingly engaged with a reverse drive gear 414 rotatably carried by a bearing 416 on the output driving shaft 400. The forward drive gear 404 and the reverse drive gear 414 have on their inner faces sets of positive interlocking coupling teeth 418 and 420 respectively. Intermediate the coupling teeth 418 and 420 is a forward-neutral-reverse shifting cone 422 splined for rotation with and axially movable on the output driving shaft 400, and having on both its lateral faces similar mating positive interlocking coupling teeth 424 and 426 respectively. It will be seen that the coupling teeth 424 and 426 of the shifting cone 422 when in the neutral N position shown in FIGS. 1 and 2, are not connected with either the gear coupling teeth 418 or 420, and therefore the output driving shaft 400 will not be drivingly connected with the output shaft 58. However, when the cone 422 is moved to the left, its coupling teeth 424 interlockingly engage the coupling teeth 418 of the forward gear 404, thereby coupling the output shaft 58 directly with the output driving shaft 400 to rotate same clockwise, or in forward F drive. When the shifting cone 422 is moved to the right as seen in FIGS. 1 and 2, the coupling teeth 420 on the reverse gear 414 will interlockingly engage with the coupling teeth 426 of the shifter cone 422, whereby the shaft 400 will be rotated counterclockwise, or in reverse R drive through the gear trains 404–406 and 412–413–414.

A shift fork 428 is fixed for rotation with a shaft 430 carried by bearings 432 in the housing 396 as seen in FIG. 12. The shift fork 428 engages in a peripheral groove 434 of the shifting cone 422. The shaft 430 extends outwardly of the housing 396 and has secured to its end a handle fitting 436 on which a forward-neutral-reverse handle 438 is mounted by means of a pivot pin 440 and is forced toward its vertical position by means of a spring clip 442 secured to the handle fitting 436. A projectiton 444 extends from the housing 396 with three slotted recesses 446 covered by a retainer element 448 to locate the handle 438 and permit it to be moved into one of the three selected positions, F or forward, N or neutral and R or reverse, thereby shifting the shifting cone 422 into the positions as heretofore described.

A standard passenger vehicle automotive transmission is normally restricted from higher speed drives when operating in reverse, and thus an interlock mechanism is preferably provided in the present transmission between the handle 438 and the shift selector drum 341, as seen in FIGS. 3, 12 and 13.

As shown, the shift selector drum 341 can be rotated downward to the R or reverse position so that the drum 341 impedes and prevents the speed control arm handle 248 from moving into any but the I or idle and the *l* or first speed positions. The shaft 342 on which the drum 341 is fixed carries on its rear end a fork element 450, which engages a pin 452 fixed into the upper end of a lever 454, the lower end of which has an L portion 456, as shown in FIG. 13. The handle fittting 436 has a U-shaped extension 458 which is positioned for engagement with the rounded end of the L portion 456 of the lever 454. With the handle 438 in the N position as shown or moved into the F position, the U-shaped extension 458 is downward, so that the L portion 456 will permit the shift selector handle 345 to be moved between the automatic A and the manual M positions. However, moving the handle 438 into the R or reverse position it will raise the U-shaped extension 458 to rotate the shift selector drum 341 to the R or reverse position of its handle 345 as shown in FIG. 13, limiting the handle 248 to positioning either in idlle or in first gear speed. Shifting the lever 438 again to its neutral N position will return the shift selector handle 345 into its manual M position.

Other modifications of the invention

FIGS. 24–43 diagrammatically illustrate several other types of transmissions embodying the principles of my present invention. The continuous gear-mesh shift transmission systems shown in FIGS 24–30, 31–34 and in FIG. 35 primarily differ from the transmission of FIGS. 1–23 in that transfer gears are used with the primary driver and ratio alternater driver gears to develop thereby a selective alternative gear-mesh of the transfer gears with common driven gear or gears of the output shaft. FIG. 35 also illustrates the application of two ratio alternater devices for continuous gear-mesh shifting when the primary gear trains have different speed ratios which are not arranged in a successive proportional ratio order, or in which cyclings are not in uniformly proportionate order.

The device shown in FIGS. 36 to 41 illustrates the application of the invention to a gear drive type positive clutch device, and the device shown in FIG. 42 illustrates a simplified arrangement for a two speed transmission.

These other modifications are shown diagrammatically to illustrate distinctions from the modification of FIGS. 1–23, and certain components which may not be shown but are explained in the following descriptions are understood to be similar in components and functionally to those shown in FIGS. 1–23. Furthermore it will be apparent that the unique concepts of my present invention may be applied to numerous devices other than "transmissions" as this term is commonly used, and the preferred embodiments are shown basically for purposes of explanation.

(I) FIGS. 24–30

(A) Primary drive system.—An input shaft 470 has on it inner end an input driver gear 472 constantly engaged with a driven gear 474 fixed for rotation with a primary driver shaft 476 on an axis parallel to the axis of the input shaft 470. Primary driver gears 478, 480 and 482 are also fixed for rotation with the primary driver shaft 476. The primary driver gears 478, 480 and 482 are of different diameters and are in constant gear-mesh with corresponding axially aligned primary driver transfer gears 484, 486 and 488 respectively.

An output shaft 514 is rotatably fixed by bearings at the rear and concentrically inside the input gear 472 for independent rotation therewith but with the same axial alignment with the input shaft 470. The output shaft 514 is splined for rotation with a driven shaft 516 but is freely axially movable thereon.

(B) Ratio alternater drive system.—A ratio alternater 492, constructed preferably like that shown in FIGS. 17–18 previously described, has its driver element fixed for rotation with the primary driver shaft 476 and its driven element fixed for rotation with a ratio alternator output shaft 490, which is rotatably fixed with its axis offset relative to the axis of the driver shaft 476. The ratio alternater 492 drives the ratio alternater output shaft 490 with alternating infinite variations between minimum and maximum driver to driven ratio values, relative to the variations of the effective ratio alternater driver to driven element driving radii ratios. The aforesaid ratio values are selected to be proportioned to the input to output ratios of successive primary gear trains. Ratio alternater driver gears 494, 496 and 498 are fixed for rotation with the ratio alternater output shaft 490 and are constantly engaged wtih axially aligned ratio alternater driver transfer gears 500, 502 and 504 respectively. A second ratio alternater 508 constructed preferably like that shown in FIGS. 19A–19B previously described, has its driver element integral wtih the ratio alternater driver gear 498 and its driven element integral with a second ratio alternater driver gear 510 and its second ratio alternater output shaft 506, its axis being offset and parallel to the axis of the first ratio alternater output shaft 490. The second ratio alternater 508 drives the driver gear 510 with alternating infinite variations between a minimum driver to driven ratio value and a ratio sufficiently high to effect a substantially zero speed output, relative to the variations of the effective second ratio alternater driver to driven element driving radii. The minimum ratio value is selected to be proportional to the input to output ratio of the primary gear train 482, 488. The second ratio alternater driver gear 510 is in constant gear-mesh with a second ratio alternater driver transfer gear 512.

All of the driver transfer gears 484, 486, 488, 500, 502, 504 and 512 have internal splines or like positive gear elements, and are rotatably fixed by individual bearings for independent rotation on an axis common to the axis of the output shaft 514.

A male splined driven gear 520 and a ratio alternater driven gear 518 are integrally formed at opposite ends of the driven shaft 516 for positive sliding engagement with respective internally splined primary and ratio alternater transfer gears. The aforesaid transfer driver gears are axially spaced as shown in FIG. 24, and are so related to the spacing of the driven gears 518 and 520 that upon selective axial shifting of the driven shaft 516, from the extreme idle position as shown in FIG. 24, leftward to an extreme direct drive position, and vice versa, they will consecutively and alternatively effect a full engagement one at a time with only one primary driver transfer gear and then with only one ratio alternater driver transfer gear.

(C) Positively driven permanently synchronized automatic mechanical shifting mechanism.—The shifting mechanism comprises a shifter shaft 524, selectively automatically cycled and operated by a preferred cycling mechanism similar to that used to cycle and operate the cam shaft 174 as shown in FIGS. 1–23, but its functions will be modified as required for application to the presently described transmission. The shifter shaft 524 is rotatably fixed on an axis parallel with the axis of the output shaft 514 and drives a shaft 526 rotatably fixed on an axis extending substantially normal to the axis of the outut shaft 514 to be driven thereby through permanently meshed bevel gears 528 and 530. The bevel gear 530 has a Geneva-gear type driver disc 532 which drives a complementary Geneva-gear type driven cam 534 fixed for rotation with cam shaft 540 on an axis parallel to the axis of the driver disc 532. The driver disc 532 has two driver pins 536. When a driver pin 536 drivingly engages a slot in the driven cam 534, same will be rotated, and when a radially substantially constant cam portion 538 of the driver disc 532 meets the complementary concave portion of the driven cam 534, same will be caused to stop in a "dwell" position until the next driver pin 536 drivingly engages the next slot of the driven member 534. In operation, the cycling of the "first shift action" starts from the stop or idle position of the shifter shaft 524 shown in FIG. 27, when the driver pin 536 starts to rotate the driven member 534, and continues until the driver pin 536 disengages. At this moment, shown in FIG. 28, the "second shift action" starts, effecting a shift dwell during an interim position shown in FIG. 29, until the next driver pin 536 engages the next slot of the driven member as shown in FIG. 30, at which time the "third shift action" starts to rotate the driven cam shaft 540 again until the driver disc 532 is stopped once gain at the position shown in FIG. 27, completing one complete shift cycle. A spurgear 542 fixed for rotation with the cam shaft 540 transfers the rotation and dwell functions of the first, second and third shift actions to the teeth of a constantly gear-meshed annular rack 544 of the driven shaft 516.

The shifting operation, starting from the transmission idle position shown in FIG. 24 proceeds as follows: The "first shift action" effects axial shifting of the driven shaft 516 with the ratio alternater driven gear 518 to produce full engagement thereof with the internal splines of the second ratio alternater driver transfer gear 512 at such time as the second ratio alternater 508 is substantially at its zero output speed rotational cycle; then the "second shaft action" provides a shift dwell during which the necessary angular rotation of the second ratio alternater 508 changes its ratio toward the selected minimum ratio value, accelerating the rotational speed of the gear train 510–512–516, so that the rotational velocity of the driven gear 520 becomes substantially the same as the rotational velocity of the internal splines of the first speed primary driver transfer gear 488; at this moment the "third shift action" shift movement will effect full gear-mesh engagement of the driven gear 520 and transfer gear 488 while the ratio alternater driven gear 518 is simultaneously disengaged from the driver transfer gear 512 during that rotational cycle time in which the second ratio alternater becomes substantially at its minimum ratio value, thus completing one complete shift cycle with continuously maintained positive input shaft 470 to output shaft driving gear-mesh throughout, with the transmission now running in its first speed. When the next shift is selectively started for shifting to the next higher speed, the "first shift action" will effect shifting of the driven shaft 516 to first disengage the primary driven gear 520 from the driver transfer gear 488 while simultaneously engaging the ratio alternater driven gear 518 with the next ratio alternater driver transfer gear 504 at the angular rotational cycle time when the first ratio alternater 492 becomes operatively substantially at its selected maximum ratio value, after which the "second shift action" effects a shift dwell while the ratio alternater 492 varies toward its selected minimum ratio value, at which time the "third shift action" will effect shifting again to disengage the ratio alternater driven gear 518 from its driver transfer gear 504 while substantially simultaneously engaging the primary driven gear 520 with the next primary driver transfer gear 486 at the rotational cycle time when the ratio alternater 492 is at its selected minimum ratio value. The transmission is now running in its second speed. Further shifting to the third speed in which the primary driven gear 520 is engaged with the primary driven transfer gear 484 will be attained in a similar shifting sequence, and in the final shift to the left of the driven shaft 516, the primary driven gear 520 will engage with the internal splines of the input shaft drive gear 472, providing a direct coupled in-line driving engagement between the input shaft 470 and the output shaft 514. Shifting to lower speeds is achieved in the same manner, except that the shifter shaft 524 will be selectively automatically cycled into opposite rotating direction for each complete-shift cycle, and each "first shitf action" will start when either of the ratio alternaters is at its substantially minimum ratio value.

It will be apparent that the principle of continuous gear-mesh shifting of the foregoing transmission modification is substantially the same as the first described transmission of FIGS. 1–23.

(II) FIGS. 31–34

Another modification of the invention illustrated diagrammatically differs from the previously described modification of FIGS. 24–30 in that all of the driver transfer gears are rotatably mounted in evenly spaced position to transfer the rotations of their respectively meshed driver gears to relatively parallel gear-mesh lines which are parallel to the output shaft axis and at equal though not necessarily common distances therefrom, to enable a single axially shiftable driven gear to effect all requisite gear-mesh drives for the different speeds. Another feature is that the ratio alternater device is driven directly from the front side of the input shaft and all of its ratio alternater driver gears are disposed in positions disposed between their successively operated corresponding primary driver gears, resulting in the use of one common driven gear and also in a shorter length of output shaft for the given number of gear trains. Another advantage is that the driver shaft is used also as the input shaft to lessen frictional loss due to gear-mesh involvement when driving in the continuous primary gear train from input to output shafts.

(A) Primary gear drive system.—An input primary driver shaft 550 carries a plurality of primary driver gears 552 having different diameters (only one of the driver gears being indicated by a reference number for clarity) and in constant gear-mesh with respective primary driver transfer gears 554 providing parallel gear-mesh lines at a common distance from an output shaft 574 having a fixed axis of rotation substantially parallel to the axis of the input primary driver shaft 550 and carrying a driven gear 582 to be described. The primary driver transfer gears 554 are rotatably mounted by means of bearings 556 which angularly bored sleeves 557 non-rotatably fixed to an inclined primary driver transfer gear shaft 558 as shown in the FIG. 33 detail.

(B) Ratio alternater drive system.—A geared type ratio alternater device, similar to that shown in FIG. 15 and previously described, comprises a ratio alternater driver element gear 566 formed integral with a gear 562 and driving a ratio alternater driven element gear 568 which is fixed for rotation with a ratio alternater output shaft 570 rotatably fixed on an axis disposed parallel to the axis of the output shaft 574. The first primary driver transfer gear 554, on the left, operates to drive an idler gear 560 rotatably carried on the output shaft 574 to constantly drive the gear 562 which is rotatably carried on a shaft 564. The ratio alternater driver element gear 566 continuously drives its driven element gear 568 with alternating infinite variation between selected minimum and maximum ratio values, relative to the variation of their effective driving radii ratios as they rotate. The minimum and maximum ratio values are selected to be proportional to successive primary driver gear 552 to driven gear 582 ratios. A plurality of ratio alternater driver gears 576 fixed for rotation with the ratio alternater output shaft 570 are so arranged to successively line up between corresponding successive primary driver gears 552. A second ratio alternater 580, preferably of the type shown in FIGS. 19A–19B previously described, has its driver element integral with the first-to-second speed ratio alternater driver gear 576 and its driven element integral with a second ratio alternater driver gear 578 and its shaft, which is rotatably fixed with its axis offset from the axis of the driver element. The second ratio alternater is driven with alternating variation between a selected minimum ratio value and a maximum ratio value sufficiently high to effect substantially zero output speed. The minimum ratio value is selected to be proportional to the ratio of the lowest speed primary gear train. The first ratio alternater driver gears 576 and the second ratio alternater driver gear 578 are in constant gear-mesh with ratio alternater driver transfer gears 572 and 573 respectively, which are individually rotatably fixed on offset axes by means of the construction shown in FIG. 34 to be substantially parallel to the axis of the output shaft 574 so that they form a parallel gear-mesh line at a common distance from the output shaft 574. The gears 572 and 573 may also be individually rotatable on an inclined shaft as are the gears 554 rather than on the individual shaft segments shown in FIG. 34 if desired.

The common driven gear 582 is formed integrally on an internally splined driven shaft arranged for free axial movement on and rotatable with the externally splined output shaft 574, and is arranged for selective axial shifting to be alternately engaged with either one primary driver transfer gear 554 or with one succeeding ratio alternater driver gear 572 or 573, there being a minimum axial clearance between successive transfer gears to effect substantially full gear width mesh in total while shifting so as to deliver uninterrupted full torque at all times.

(C) Positively driven permanently synchronized automatic mechanical shifting mechanism.—A shifter cam drum 583, incorporating a shifter sleeve 584, which is positively driven with selective automatic cycling by a shifter system as shown and explained with the embodiment of FIGS. 1–23 or other similarly functioning shifter system, although it may be modified as needed to provide the additional shifts required for this transmission. The shifter cam drum 583 functions the same as the shifter cam drum 132 of the FIG. 1 embodiment, and the shifter sleeve 584 functions the same as the shifter sleeve 140 of the FIG. 1 embodiment. The shifter sleeve 584 is connected by its shifter arm to the driven shaft and driven gear 582 preferably by the illustrated single radial and two thrust bearings relative rotation with the driven gear 582.

In the first complete shift cycle, a "first shift action" will effect shifting of the driven gear 582 from the idle position shown in FIG. 31 to mesh with the second ratio alternater driver transfer gear 573 when the second ratio alternater 580 output speed is substantially zero; then during the "second shift action" dwell the driven gear 582 will accelerate; following which the "third shift action" will effect shifting of the driven gear 582 to disengage from the second ratio alternater driver transfer gear 573 while simultaneously engaging with the first primary driver transfer gear 554 during the period in which the second ratio alternater 580 is driving at its minimum ratio value rotational cycle. Further complete shift cycles will shift the driven gear 582 to alternatively disengage from an engaged primary driver transfer gear 554 while simultaneously engaging with the next ratio alternater driver transfer gear 572, and following the change of ratio or speed effected by the first ratio alternater 566–568, the driven gear 582 will be shifted to the next primary driver transfer gear 554, the shifts being effected by the previously described first, second and third shift actions at the rotational cycle times when the ratio alternater 566–568 is substantially at its selected maximum, varying and minimum ratio values respectively.

(III) FIG. 35

Herein illustrated is the application of multiple rotational ratio alternaters in a transmission constructed in accordance with the concept of my invention. Such additional ratio alternaters may be required if the successive constant speed primary gear-trains do not progress uniformly to higher speeds with unidirectional shifting or do not progress in proportional ratios, or if the positive shifting time sequences are different, or in other cases which might arise.

(A) Primary drive system.—As shown, an input drive shaft 620 rotatably carries a plurality of primary driver gears 622A, 624A, 626A and 628A, respectively constantly engaged with primary driver transfer gears 622B, 624B, 626B and 628B rotatably fixed with axes substantially parallel to the axis of the input driver shaft 620. An exteriorly splined output shaft 633 is rotatably fixed on an axis substantially parallel to the axis of the input driver shaft 620 and carries a sleeve shaft 632 having on one end an internally splined primary driven gear 630 having free axial movement on the splined output shaft 633 and rotating therewith. The primary driver transfer gears 622B, 624B, 626B and 628B are arranged to be commonly engageable with the primary driven gear 630 upon axial shifting thereof. The primary driver gears 628A, 626A and 624A respectively designated herein as the first, second and third speed gears provide proportional and progressively lower driver gear to driven gear ratios when driving; however when the driven gear 630 is driven by the primary driver gear 622A or fourth speed gear, a progressively higher gear ratio results which may not be proportional with the other ratios.

(B) Ratio alternater drive system.—A first ratio alternater device comprises driver and driven elements 634 and 635 and a second ratio alternater device comprises driver and driven elements 644 and 645. Both ratio alternaters are preferably similar in construction and function to that shown in FIGS. 17 and 18 previously described. The first ratio alternater driver element 634 drives the driven element 635 with selected minimum and maximum ratio values respectively proportional to the ratios of successively adjacent primary driver gears 628A, 626A and 624A to the primary driven gear 630, and the second ratio alternater drive element 644 drives the driven element 645 with selected maximum and minimum ratio values respectively proportional to the ratios of successively adjacent primary driver gears 624A and 622A to the primary driven gear 630. The first ratio alternater driver element 634 is fixed for rotation with the inner end of the input driver shaft 620, and the first ratio alternater driven element 635 is fixed for rotation with a first ratio alternater output shaft 636 rotatably fixed on an axis offset and parallel to the axis of its driver element. A first to second speed ratio alternater driver gear 640A and a second to third speed ratio alternater driver gear 638A are fixed for rotation with the output shaft 636. The second ratio alternater driver element 644 is fixed for rotation with an input shaft 647 having a fixed axis parallel to the axis of the input drive shaft 620 and constantly rotated therewith by a driven gear 646 in constant gear-mesh with the primary driver gear 628A. The second ratio alternater driven element 645 is fixed for rotation with a second ratio alternater output shaft 648 having a fixed axis offset and parallel to the axis of the input shaft 647. As second ratio alternater driver gear 648A is fixed for rotation with the output shaft 648 and constantly drives a second ratio alternater driver transfer gear 648B through an interim transfer gear 648C rotatably fixed on the shaft 636. The first to second and second to third ratio alternater driver gears 640A and 638A respectively are in constant gear-mesh with respective driver transfer gears 640B and 638B rotatably fixed and so arranged that they and the transfer gear 648B are commonly engageable with a ratio alternater driven gear 642 fixed on the other end of the sleeve shaft 632 and internally splined for free axial movement on and rotation with the splined output shaft 633. The driven gears 642 and 630 are connected for constant movement and rotation together by the sleeve shaft 632, which is rotatable within a shifter arm 632A fixed thereon.

(C) *Positive driving permanently synchronized automatic mechanical shifting mechanism.*—The selective positive shifting of the driven gears 630 and 642 by the sleeve shaft 632 having shifter arm 632A connected thereto is preferably accomplished by a positively driving, permanently synchronized, selectively automatically cycled, automatic mechanical shifting mechanism similar to that shown and described with the transmission of FIGS. 1–23; however the automatic control system may be modified as necessary for the requirements of this transmission. The shifter arm 632A is functionally equivalent to the shifter arm 148 of the FIG. 1 embodiment.

For the shifting operations, starting from the first speed position shown in FIG. 35, where the primary driven gear 630 is driven at a constant speed by the engaged primary driver transfer gear 628B from its first speed primary driver gear 628A, the primary driver and ratio alternater driver gears, with their respective transfer gears, are so arranged and the driven gears are so spaced that only one can be in full gear-mesh at a time, and there is a minimum clearance of adjacent gears so that when their driven gears are shifted the overlapping thereof will always result in there being substantially one gear-face width in total being in mesh. As in the previously described shifting actions of each complete shift cycle, a "first shift action" will effect shifting to disengage the primary driven gear 630 from the primary driver transfer gear 628B while substantially simultaneously engaging the ratio alternater driven gear 642 with the ratio alternater driver transfer gear 640B at the angular rotational cycle in which the first ratio alternater driven element 635 is driven by the driver element 634 at substantially their maximum radii ratio value; then during the "second shift action" shift dwell the ratio alternater driven gear 642 is accelerated toward that speed at which the ratio alternater is operating at its minimum radii ratio value; then the "third shift action" will shift to disengage the gears 642 and 640B while substantially simultaneously engaging the primary driver gear 630 with the second speed primary driver transfer gear 626B, which are now substantially synchronously rotating, to thereafter drive the output shaft 633 in the second speed gear position. The driven shaft 632 may again be shifted to the left by further first, second and third shift actions with the same functions as the heretofore described complete shift cycle, finishing with the primary driven gear 630 being engaged with the third speed primary gear 624B.

The next positive shifting from third to fourth speed gear is accomplished by applying the ratio varying operations of the second ratio alternater device 644–645. It will be noted that the second ratio alternater 644–645 is positioned to cycle 180° oppositely to the first ratio alternater 634–635 as can be seen in FIG. 35, using the same positive shifter device for the third to fourth speed shifting, and vice versa. In operation, the "first shift action" shifting effects disengagement of the primary driven gear 630 from the primary driver transfer gear 624B while substantially simultaneously engaging the ratio alternater driven gear 642 with the ratio alternater driver transfer gear 648B substantially in the angular cycling time at which the second ratio alternater 644–645 is operating substantially at its minimum ratio value; then the continuing "second shift action" shift dwell provides the necessary angular rotational time to decelerate the driven gear 630 by means of the varying effective driving radii ratio of the ratio alternater driver and driven elements 644 and 645, at which time the second ratio alternater is operating substantially at its selected maximum ratio value; then the "third shift action" shift movement will disengage the gears 642 and 648B while substantially simultaneously engaging the synchronously rotated primary driven gear 630 with the fourth speed primary driver transfer gear 622B, for continuous drive of the transmission in its fourth speed.

Continuously maintained positive gear-mesh shifting back from fourth to third, then third to second, and second to first speed gears is accomplished similarly but with opposite ratio values of the ratio alternaters relative to the shift cycles of the first, second and third shift actions, for each complete shift cycle.

(IV) FIGS. 36–41

Illustrated is a simplified continuously maintained gear-mesh shifting geared positive clutch.

(A) *Primary drive system.*—An input shaft 660 has a primary driver gear 674 rotatably fixed therewith, which gear 674 is in the form of the driver member of a positive interlockingly toothed clutch. An output shaft 680 is fixed for independent rotation but axially aligned with the input shaft 660 and is splined to rotate with a primary driven gear 678 having free axial movement thereon, which gear 678 is in the form of the driven member of the positive clutch. A gear 662 is fixed for rotation with the input shaft 660 to drive a gear 664 fixed for rotation with a shifter cam shaft 666, having its axis fixed parallel to the axis of the output shaft 680.

(B) *Ratio alternater drive system.*—A ratio alternater driver element 668 is fixed for rotation with the shifter cam shaft 666, and drives a driven element 670 which is integral with a ratio alternater output shaft 671 fixed for rotation with its axis offset and parallel to the axis of the shifter drum shaft 666. The ratio alternater device 668–670 is preferably constructed as shown in FIGS. 19A–19B heretofore described. The ratio alternater driven element 670 is driven by its driver element 668, due to their variably alternating effective radii, between a selected minimum ratio value and a ratio producing a substantially zero output speed. The minimum ratio value is selected to be proportional to the input to output shaft one-to-one when connected. A ratio alternater driver gear 672 is fixed for rotation with the ratio output shaft 671. A ratio alternater driven gear 682 is internally splined for rotation with the externally splined output shaft 680 and for free axial movement thereon. The ratio alternater driven gear 682 is connected with the primary driven gear 678 by a sleeve shaft 676 for their common positive rotation and axial movements.

(C) *Positive driven, permanently synchronized automatic mechanical shifting mechanism.*—A shifter cam 684 is fixed for rotation with the shifter cam shaft 666, and has on its opposite lateral faces axially projecting cam surfaces 686 and 688 respectively. Two shift lever arms 690 and 692 are pivotally fixed by pivot bolts 694 to the transmission casing (indicated by phantom lines), having shifter fork members 696 and 698 fixed thereon, and are pivotably interconnected by a connector bar 700 for common movements. The shift lever arms 690 and 692 respectively carry shift rollers 702 and 704 rotatable and axially slidable thereon for selective engagement with the respective shifter cam surfaces 686 and 688. A tilting actuator arm 706 is pivotally fixed at its center by a pin 708 and its opposite fork ends are operably connected with the rollers 702 and 704 to position same with opposite axial movements on the shift lever arms 690 and 692. The actuator arm 706 is selectively operated to tilt in one direction or the other by shift actuator solenoids 710 and 712. The U-shaped lower arm of the shifter fork member 696 is extended to operably engage a peripheral shifter groove 714 provided on the sleeve shaft 676. One end of the shifter fork 696 lower arm has a flange 716 provided with three detents 718 engageable by a spring-loaded ball 720, for locating the shift or fork members 696 and 698 in their three shifted positions. The selective automatic shift cyclings are controlled by shift signal cams 724 and 726 fixed for rotation with the shifter cam shaft 666, with their angularly permanently positioned cam lobes operable to actuate limit switches 728 and 730 respectively, shown in FIG. 36 and the electrical control circuit of FIG. 41.

In operation of the device, to shift to direct drive D or clutched position, starting from the "OFF" or declutched position, with the input shaft 660 rotating clockwise and the shifter cam shaft 666 rotating counterclockwise as seen from the left of FIG. 36, when the selector switch is manually turned to the drive D position, the contacts 733 are closed, so that when the signal cam 726 actuates to close the contacts of the signal limit switch 730 at that predetermined rotational angular moment at which a highest axial cam projection 688B has rotatably passed the contact line of the shift roller 704, i.e. after the line marked "LS730" on FIG. 40A, the solenoid 710 is energized to pull its core inward and tilt the actuator arm 706, so that one fork end moves the shift roller 702 axially outward and the other fork ends moves the shift roller 704 axially inward. This action is effected during that segment of the angular rotation cycle of the shifter cam 684 designated "shift-roll in" in FIG. 40A in which segment there are no cam projections. A "first shift action" starts when the shift roller 704 meets the rising projection of a cam segment 688A designated "shift 1" in FIG. 40A and at the angular cycle time when the ratio alternater driven element 670 is at its substantially zero rotation (maximum ratio). The cam segment 688A will push the shift roller 704 axially outward to the left with its shifter arm 698 and the connector bar 700 with the shifter arm 696, to shift the sleeve shaft 676 to the left, moving the ratio alternater driven gear 682 into full gear-mesh engagement with the ratio alternater driver gear 672 while shifting with it the primary driven gear or clutch 678 close to but not engaged with the primary driver gear or clutch 674. After completion of the "first shift action" the "second shift action" effects a shift dwell during which the shift roller 704 rolls on the non-sloped cam segment designated "dwell" in FIG. 40A, between the cam segments 688A and 688B, while the ratio alternater driver element 668 accelerates the driven element 670, due to their varying driving radii ratios, toward the ratio alternater selected minimum ratio value, thereby accelerating the rotations of the ratio alternater driver and driven gears 672 and 682 with the output shift 680; the "third shift action" shifting starts when the further rising cam segment 688B contacts and forces the shift roller 704 to move further leftward during the shift cycle designated "shift 2" in FIG. 40A, to shift the ratio alternater driver and driven gears 672 and 682 out of gear-mesh while substantially simultaneously shifting the now synchronously rotating primary driver and driven gear positive clutches 674 and 678 into interlocking positive engagement, with accurate tooth alignment, at the angular rotational cycle time when the ratio alternater is functioning substantially at the selected minimum ratio value. After completion of the "third shift action" the output shaft 680 is positively directly clutched with the input shift 660. At this moment the shift roller 704 has been pushed outwardly enough to have a running clearance with the highest cam segment projection 688B, which position is secured by the respective shifter arm detent 718.

Shifting to "off" or declutched position is accomplished in the same manner as the first, second and third shift actions but in reverse, starting with the angular rotational cycle of the ratio alternater 668–670 at its minimum ratio value and ending at a zero speed output (maximum ratio value). The input shaft 660 and the shifter cam shaft 666 rotate continuously in the same direction, but when the manual selector switch is moved to the "OFF" position the contacts 732 will close, so that when the shift signal cam 724 actuates the signal limit switch 724 to close its contacts, the solenoid 712 is energized to tilt the actuator 706 in the other direction, pulling the shift roller 704 outward while pushing the shift roller 702 inward, which action is effected during that segment of the angular rotational time designated as "shift-roll in" on FIG. 40B in which segment there are no cam projections. The "first shift action" shifting starts when a sloping cam segment 686A rotatably meets the shift roller 702 to move it axially to the right, shifting the driven gear clutch 678–674 out of engagement while substantially simultaneously engaging the ratio alternater driver and driven gears 672 and 682 at the rotational cycle time when the ratio alternater is functioning at the minimum ratio value; then the "second shift action" effects a shift dwell during the period when the shift roller 702 rolls on a non-sloped portion of the cam element 688, in which cycle time the ratio alternater 668–670 decelerates the output shift 680 toward zero speed; then the "third shift action" shift starts when a highest cam projection 686B moves the shift roller 702 further to the right, shifting the ratio alternater driver and driven gears 672 and 682 out of engagement at the time when the ratio alternater is substantially at its zero speed output rotational cycle (maximum ratio value), thus completing the shift to declutch the output shaft 680 from the input shaft 660.

If a positive stop of the output shaft 680 is required in declutched position a positive stop tooth 722, shown in FIG. 39, engages the ratio alternater driven gear 682 while it is being shifted into the zero speed position.

(V) FIG. 42

This modification, with which the details of FIGS. 37, 38, 40, 40A, 40B and 41 are also incorporated, illustrates the application of a similar positive drive shifting principle to a two-speed continuous gear-mesh shift transmission having direct drive and lower output speed positions. This dual-shaped transmission differs from the geared positive clutch of FIG. 36 in that the ratio alternater 764 is alternating between maximum and minimum ratio values which are selected to be respectively proportional to the ratios of the direct drive and second primary gear trains, where the second gear train has a lower gear ratio than direct drive or one-to-one. However, the second gear train may be of higher speed if desired, in which case the ratio alternater alternates proportionally between a one-to-one and a higher ratio value.

(A) Primary drive system.—An input shaft 750 has a gear 752 fixed for rotation therewith and engaged with a driven gear 754 fixed for rotation with a shifter cam shaft 756 disposed on an axis parallel to the input shaft 750 axis. A primary driver gear 758A is fixed for rotation with the cam shaft 756 and is selectively engageable with an internally splined driven gear 758B fixed for rotation with an externally splined output shaft 762 and for free axial movement thereon. The output shaft 762 is axially aligned with the input shaft 750. A primary driver gear 774 formed as a direct drive positive clutch member is integral with the driver gear 752, and a primary driven gear 772 formed as a direct driven positive clutch member 772 is integral with the primary driven gear 758B as shown.

(B) Ratio alternater drive system.—A ratio alternater 764 is used which is similar to or of the same type as that shown in FIGS. 17–18 and heretofore described. The driver element of the ratio alternater 764 is fixed for rotation with the shifter cam shaft 756, and its driven element is integral with a ratio alternater driver gear 766A fixed for rotation with a ratio alternater output shaft 768 having its axis offset and parallel to the axis of the driver element of the ratio alternater 764. An internally splined ratio alternater driven gear 766B is rotatable with the exteriorly splined output shaft 762 and also with the primary driven gear 758B by means of a sleeve shaft 760.

(C) Positive driven permanently synchronized automatic mechanical shifting mechanism.—This device is denoted generally by the reference numeral 770 and is substantially identical in construction and operation to the automatic mechanical positive shifter mechanism previously described and shown in FIGS. 36–41, and for clarity the details are not designated by reference characters in FIG. 42.

In operation, shifting starts from the low speed position shown in FIG. 42, the input shaft 750 being rotated in clockwise direction, looking at the transmission from the left. When the manual selector switch handle is moved from neutral N position to direct drive D as shown in FIG. 41, the contacts 733 will close so that when the shift signal cam 726 closes the contacts of the signal limit switch 730, the solenoid 710 is energized, tilting the shift actuator arm 706 to pull outward the shift roller 702 while pushing inward the shift roller 704, during the rotational cycle time designated "shift-roll in" in FIG. 40A. The "first shift action" shifting starts when the cam segment 688A rotatably meets and pushes the shift roller 704 axially to the left, effecting engagement of the ratio alternater driven and driver gears 766B and 766A while substantially simultaneously disengaging the primary driven and driver gears 758B and 758A, at the rotational cycle time when the ratio alternater 764 is substantially at its minimum ratio value. Then during "second shift action" dwell period, the ratio alternater drivingly accelerates its gears 766A–766B with the output shaft 762 toward its proportional direct drive or maximum ratio value, thereby driving the primary driven gear or clutch 772 to rotate synchronously, with accurate tooth alignment, with the primary driver gear or clutch 774; then the "third shift action" shifting will be accomplished when the highest cam projection 688B moves the shift roller 704 further to the left effecting further leftward shift of the driven sleeve shaft 760 to engage the synchronously drive gear or clutch 772 with the driver gear or clutch 774, while simultaneously disengaging the ratio alternater driven gear 766B from the driver gear 766A, at the rotating cycle of the ratio alternater 764 when it is functioning substantially at the maximum ratio value. The transmission is thus shifted with positive gear-mesh being maintained between the input to output shafts at all times, resulting in uninterrupted full torque delivery with continuous gear-mesh shifting.

Shifting from high to low gear speed is accomplished in the same fashion but in reverse. When the manual selector switch is actuated to "LOW" position, it closes the contacts 733 so that when the shift signal cam 724 actuates the limit switch 728 to energize the solenoid 712, the shift actuator 706 is pulled to pull out the shift roller 704 while pushing the shift roller 702 inward, during the cycle designated "shift-roll in" in FIG. 40B. Then the "first shift action" shifting starts when the cam segment 686A rotatably pushes the shift roller 702 axially to the right, thereby declutching the primary driven and driver gears or clutches 772 and 774 while simultaneously engaging the ratio alternater driven and driver gears 766B and 766A; then during the "second shift action" dwell, the ratio alternater 764 drivingly decelerates the output shaft 762 with its driven gears 758B and 766B; following which the "third shift action" shifting will occur when the highest cam projection 686B designated "shift 2" in FIG. 40B shifts the shift roller 702 further to the right to disengage the ratio alternater driven and drier gears 766B and 766A while simultaneously engaging the synchronously rotated primary driven gear 758B with its driver gear 758A during the rotational cycle time of the ratio alternater when it functions substantially at its minimum ratio value. The transmission is thus shifted back to the low speed drive shown in FIG. 42.

In the transmission of FIGS. 36 and 42, because the shifter cam 684 is able to function while rotating in one direction only, these transmissions with this type of positive shifter mechanism are only applicable to one directional input rotation. If both directional drives are required then these transmissions may be arranged with a positive shifter mechanism similar to the one shown with the embodiment of FIGS. 1–23.

Also, the electrical control system shown in FIG. 41 may be replaced by a mechanical, hydraulic or pneumatic control system, in which the selector switch will be replaced with a bi-directional valve, spring returned to center position, the limit switches 728 and 730 will be replaced with valves of the spring return type, and the solenoids 710 and 712 will be replaced with a cylinder, similar to that system shown in FIG. 22A.

It can be seen that the devices shown in FIGS. 36 and 42 may be coupled to produce a multiple speed driving transmission for any gear speed ratios desired, including zero-speed or positive clutch operations. FIG. 43 illustrates diagrammatically one preferred coupling arrangement of a positive clutch device 780 like that of FIG. 36, having an input shaft 782 and an output shaft 784 which is in turn the input shaft of a two-speed transmission device 786 like that of FIG. 42, having an output shaft 788 which in turn is the input shaft of a second two-speed device 790 like that of FIG. 42 and having an output shaft 792. The positive clutch device 780 may be either first or last in the transmission line. Such a combination can produce a limitless variety of gear ratios or speeds, depending on the number of two-speed devices used, and shiftings are not limited to any particular sequence or order. It will be apparent also that the combination shown in FIG. 43 can be built into a single housing.

Although I have described and shown only a few embodiments of my invention for the purpose of illustration and clarification only and not for its limitations, it will be apparent to one skilled in the art and to which my invention pertains that various changes and modifications may be made therein without departing from the spirit of the invention as expressed by the scope of the appended claims.

I claim:
1. A motion transmitting device delivering uninterrupted motive power from an input means to an output means while changing driving ratios and comprising:
 (a) at least one primary power train selectively drivingly connecting said input and output means with a predetermined constant driving ratio;
 (b) at least one ratio alternater power train driven by said input means with alternating driving ratios varying between selected minimum and maximum ratio values, at least one value being proportional to a primary power train ratio; and
 (c) a shifter device driven by said input means and operably cycled relative to the alternating ratio function of said ratio alternater, and selectively actuated to automatically effect:
  when operated for one complete cycle, first a substantially simultaneous synchronous driving connection through said ratio alternator power train and driving disconnection of said primary power train while said ratio alternator is driving substantially at said proportional ratio value, second a shift dwell during which said ratio alternator varies toward the other ratio value, and third a synchronous driving disconnection of said ratio alternater power train while said ratio alternater is driving substantially at the other ratio value; and
  when operated for another complete oppositely functioning cycle, first a synchronous driving connection through said ratio alternater power train while said ratio alternater is driving substantially at said other ratio value, second a shift dwell during which said ratio alternater varies toward said proportional ratio value, and third a substantially simultaneous synchronous driving connection through said primary power train and driving disconnection of said ratio alternater power train while said ratio alternater is driving substantially at said proportional ratio value.

2. The device of claim 1 wherein said ratio value proportional to the primary power train ratio is said minimum ratio value, and said other ratio value is said maximum ratio value and is sufficiently high so as to effect substantially zero motion of said output means when said ratio alternater is operating at said maximum ratio value.

3. The device of claim 1 and including a second primary power train selectively alternately drivingly connecting said input and output means with a different predetermined constant driving ratio to which said other ratio value is proportional, said shifter device in the third operation of the first mentioned complete cycle effecting a substantially simultaneous synchronous driving connection through said second primary power train, and said shifter device in the first operation of the oppositely functioning complete cycle effecting a substantially simultaneous synchronous driving connection through said second primary power train, and said shifter device in the first operation of the oppositely functioning complete cycle effecting a substantially simultaneous synchronous driving disconnection of said second primary power train.

4. A motion transmitting device delivering uninterrupted motive power while changing driving ratios and comprising:
 (a) a primary driver element driven by an input means and a driven element driving an output means;
 (b) a ratio alternater comprising:
  a ratio alternater driver element driven by said input means;
  a ratio alternater driven element connected with said ratio alternater driver element and driven thereby with varying effective ratios between selected minimum and maximum ratio values;
  a ratio alternater driver member fixed to be driven with said ratio alternater driven element, and a ratio alternater driven member fixed to be driven with said primary driven element;
 (c) a shifter device comprising:
  first shift means selectively effecting a driving disconnection of connected primary driver and driven elements while substantially simultaneously effecting a driving connection of said ratio alternater driver and driven members while their motions are substantially synchronized when said ratio alternater is functioning substantially at one ratio value;
  second shift means subsequently effecting a shift dwell while said ratio alternater drivingly varies toward the other ratio value;
  third shift means subsequently effecting a driving disconnection of said ratio alternater driver and driven members when said ratio alternater is functioning substantially at said other ratio value; and
  means cycling the aforesaid actions of said first, second and third shift means synchronously with the functions of said ratio alternater to sequentially effect the aforesaid driving connecting, disconnecting and dwell operations as a complete shift cycle.

5. The device of claim 4 wherein:
 (a) said maximum ratio value is sufficiently high so as to effect a substantially zero motion of said ratio alternater driven member;
 (b) said minimum ratio value is proportional to the primary driver and driven element ratio; and
 (c) said third shift means effects said driving disconnection only when said ratio alternater has drivingly decelerated said ratio alternater driver and driven members to substantially zero motion.

6. The device of claim 4 having a second primary driver element wherein:
 (a) said ratio values are proportional respectively to the first mentioned primary driver and primary driven element ratio and to the second primary driver to primary driven element ratio; and
 (b) said third shift means effects said driving disconnection while substantially simultaneously effecting a driving connection of said second primary driver and primary driven elements when their motions are substantially synchronous.

7. The device of claim 4 having second primary driver and driven elements, wherein:
 (a) said ratio values are proportional respectively to the first mentioned primary driver and driven element ratio and to the second primary driver and driven element ratio; and
 (b) said third shift means effects said driving disconnection while substantially simultaneously effecting a driving connection of said second primary driver and second primary driven elements when their motions become substantially synchronous.

8. A multispeed transmission, constantly delivering torque through continuously meshing gear elements while shifting, and comprising:
 (a) a primary driver gear element rotated by an input shaft element and a primary driven gear element rotating an output shaft element;
 (b) a ratio alternater comprising:
  a ratio alternater driver element rotated by said input shaft element;
  a ratio alternater driven element connected with and rotatably driven by said ratio alternater driver element, the effective driving radii thereof being varied between selected minimum and maximum ratio values, one value being proportional to the primary driver and driven gear element ratio;
  a ratio alternater driver gear element fixed for rotation with said ratio alternater driven element;

and a ratio alternater driven gear element rotatable with said primary driven gear element and said output shaft element;

(c) a shifter device comprising:

first shift means selectively effecting a driving disconnection of connected primary driver and driven gear elements while substantially simultaneously effecting a driving connection of said ratio alternater driver and driven gear elements when their rotational velocities are substantially synchronous when said ratio alternater is functioning substantially at said proportional ratio value;

second shift means subsequently effecting a shift dwell while said ratio alternater effective driving ratio varies toward the other ratio value; and third shift means subsequently effecting a driving disconnection of said ratio alternater driver and driven gear elements when said ratio alternater is functioning substantially at the other ratio value; and means cycling the aforesaid actions of said first, second and third shift means synchronously with the functions of said ratio alternater to automatically sequentially effect the aforesaid driving connecting, disconnecting and dwell operations as a complete shift cycle.

9. The transmission of claim 8 in which said shifter device includes other first, second and third shift means operable to effect connecting, disconnecting and dwell operations relative to opposite functions of said ratio alternater in reverse of the operations of the first mentioned first, second and third shift means.

10. The transmission of claim 8 wherein:

(a) said maximum ratio value is sufficiently high so as to effect a substantially zero rotation of said ratio alternater driven gear element;

(b) said minimum ratio value is proportional to the primary driver and driven gear element ratio; and (c) said third shift means effects said driving disconnection only when said ratio alternater has drivingly decelerated said ratio alternater driven and driven gear elements to substantially zero rotational velocity.

11. The transmission of claim 8 including a non-rotatable element, wherein said third shift means, while effecting said driving disconnection, substantially simultaneously effects a connection between said driven gear elements and said non-rotatable element to substantially prevent said output shaft element from rotating, and said other first shift means, while effecting a driving connection of said ratio alternater driven and driven gear elements, substantially simultaneously effects a disconnection of said driven gear elements and said non-rotatable element.

12. The transmission of claim 8 having a second primary driver gear element rotated by said input shaft element, and wherein:

(a) said ratio values are proportional respectively to the primary driver gear element and primary driven gear element ratio and the second primary driver gear element and primary driven gear element ratio; and (b) said third shift means effects said driving disconnection while substantially simultaneously effecting a driving connection of said second primary driver gear element and primary driven gear element when their rotational velocities are substantially synchronous.

13. The transmission of claim 8 having a plurality of primary driver gear elements and a like plurality of primary driven gear elements respectively selectively drivingly connected with different driver and driven gear ratios wherein:

(a) said ratio values are proportional respectively to successively connectable primary driver and primary driven gear element ratios; and (b) said third shift means effects said driving disconnection while substantially simultaneously effecting a driving connection of another primary driver gear element and another primary driven gear element when their rotational velocities are substantially synchronous.

14. The transmission of claim 8 including:

(a) a second ratio alternater comprising:

a second ratio alternater driver element rotated by said input shaft element;

a second ratio alternater driven element operably connected with and rotatably driven by said second ratio alternater driver element, the effective driving radii thereof being substantially infinitely varied between second selected minimum and maximum ratio values, said minimum ratio values being proportional to a primary driver to be driven gear element ratio;

a second ratio alternater driver gear elements fixed for rotation with said second ratio alternater driven element; and a second ratio alternater driven gear element rotatable with said primary driven gear element and said output shaft element;

(b) said shifter device including:

another first shift means selectively effecting a driving disconnection of drivingly connected primary driver and driven gear elements while substantially simultaneously effecting a driving connection of said second ratio alternater driver and driven gear elements at such time as their rotational velocities become substantially synchronous when said second ratio alternater is functioning substantially at said second proportional ratio value;

another second shift means subsequently effecting a shift dwell during a rotational interval in which said second ratio alternater effective driving ratio varies toward the other second selected ratio value; and another third shift means subsequently effecting a driving disconnection of said second ratio alternater driver and driven gear elements at such time as said second ratio alternater is functioning substantially at the other second selected ratio value; and (c) said other first, second and third shift means being cycled relative to the functions of said second ratio alternater to sequentially effect the aforesaid driving connecting, disconnecting and dwell operations, and said shift actions are alternatively effective dependent on which of said first shift means is selectively operated.

15. The transmission of claim 14 wherein:

(a) the ratio values of one ratio alternater are proportional to successive two primary driver to driven gear element ratios between which said ratio alternater is functionally employed;

(b) the minimum ratio value of the other ratio alternater is proportional to one primary driver and driven gear element ratio, and the maximum ratio value is substantially high so as to effect rotation of its ratio alternater driver gear element at substantially zero velocity; and (c) the third shift means associated with said one of said ratio alternaters effects its driving disconnection while substantially simultaneously effecting a driving connection of its associated primary driver and driven gear elements when their rotational velocities are substantially synchronous, and the third shift means associated with said other of said ratio alternaters effects its driving disconnection only when the associated ratio alternater has drivingly decelerated its ratio alternater driver and driven gear elements to substantially zero rotational velocity.

16. The transmission of claim 14 wherein:
(a) the ratio values of said ratio alternaters are proportional to different successive two primary driver to driven gear element ratios between which they are functionally employed; and
(b) the third shift means associated with each of said ratio alternaters effects its driving disconnection while substantially simultaneously effecting a driving connection of the next successive primary driver and driven elements when their rotational velocities are substantially synchronous.

17. The transmission of claim 9 wherein said shifter device is constructed and arranged to form a selectively operated automatically functioning shifter mechanism comprising:
(a) a rotatable shift driver member driven by said input shaft element;
(b) a shifting actuator means operable to transmit predetermined shift cycle rotations of said shift driver member successively to said first shift means to effect the first shifting functions thereof, then to said second shift means to effect the dwell function thereof, then to said third shift means to effect the shifting functions thereof, said shift cycle rotations being angularly synchronized with predetermined angular relationships of said ratio alternater functions;
(c) a shift cycle selector means selectively cycling said shifting actuator to operate either the first or second mentioned first, second and third shift means; and
(d) at least two shift cycle start elements driven by said input shaft element and operable to actuate said selector means at a predetermined angular time when either operation is selected by manual or automatic means.

18. The transmission of claim 17 wherein:
(a) said shift driver member comprises two shift driver gear elements independently rotatably fixed on a shifter shaft and oppositely proportionally rotated by said input shaft relative to the rotations of said ratio alternater;
(b) said shifting actuator means comprises a cam drum fixed for rotation with said shifter shaft and having a continuous substantially helical cam constantly engaged with a cam actuated element operating a shifter arm engaged with said driven shaft to transfer axial camming movements into said shifting actions;
(c) said shift cycle selector means comprises a shifter cone axially movable on and rotatable with said shifter shaft between said shift driver gears for alternative cycled positive coupling engagement therewith to cyclingly rotate said shifter shaft and cam drum in one or the other direction to effect said shifting actions in one or the other axial direction, and having an intermediate stopped position to which said shifter cone is automatically returned from either axial engagement when a shifting cycle is completed; and
(d) said shift cycle start elements comprise sensing means preset angularly relative to angularly positioned engaging points of said shifter cone and shift driver gear elements.

19. The transmission of claim 17 wherein said shifting actuator means comprises a Geneva-gear type of drive and the like having a first rotating motion, a second nonrotating or dwell motion, and a third rotating motion, and having a driver member rotating with said rotatable shift driver member and a driven member rotating with a shift transfer shaft arranged to transfer said Geneva-gear drive motions to said driven shaft for axial shifting thereof to effect said first, second and third shift actions.

20. The transmission of claim 17 wherein:
(a) said shift driver member comprises a constantly rotating shifter shaft;
(b) said shifting actuator means comprises a cam drum fixed for rotation with said shifter shaft and having three cam segments respectively for each first, second and third shift cycle actions, and a cam actuated element selectively engaged with said cam segments for operating a shifter arm engaged with said driven shaft to transfer camming movements into said shifting actions; and
(c) said shift cycle selector means comprises a shifter fork operable to engage said actuated element with said cam segments to effect said first, second and third shift actions.

21. A ratio alternater device in combination with a rotation transmitting device, an automatic shifter device, and a shift cycle start device, wherein:
(a) said rotation transmitting device comprises an input means rotating at least one driver gear element, and at least one driven gear element rotating an output means when connected with said driver gear element,
(b) said ratio alternater device comprising a rotatable input means rotating a driver element, a driven element rotated by said driver element with alternating substantially infinitely varying effective driving ratios between minimum and maximum ratio values relative to their alternately changing effective driving radii, at least one driver gear element rotated with said driven element, and at least one driven gear element maintaining the rotation of said output means when the ratio alternater driver and driven gear elements are connected;
(c) said shifter device comprising a shift driver element driven by an input means, and a shift cycle start means driven by an input means, to selectively shift said rotation transmitting and ratio alternater gear elements into said connections with synchronous shifting actions in coordination with the functions of said ratio alternater; and
(d) said input means being rotated together at least during shifting.

22. The ratio alternater of claim 21 wherein the driver and driven elements comprise constantly meshed driver and driven gear elements each having at least one selected maximum and at least one selected minimum radius, and rotatable on axes such that when the maximum radius of said driver gear element drivingly meshes with the minimum radius of said driven gear element, same is driven with a selected minimum ratio, and alternately when the minimum radius of said driver gear element drivingly meshes with the maximum radius of said driven gear element, same is driven with a selected maximum ratio value, and the driving ratio of said gears substantially infinitely varies between said minimum and maximum ratio values relative to the effective driving radii of said gears.

23. The ratio alternater of claim 21 wherein:
(a) said ratio alternater driver element comprises a crank rotatable at a selected fixed radius from its axis; and
(b) said ratio alternater driven element comprises a member rotatable on a fixed axis offset from said crank axis and drivingly engaged therewith, such that when said crank drives said driven member at its minimum radius, then it is driven at a selected minimum ratio value, and when said crank alternately drives said driven member at its maximum radius, then it is driven at a selected maximum ratio value, and the driving ratio of said elements substantially infinitely varies between said minimum and maximum ratio values relative to the effective driving radii of said elements.

24. The ratio alternater of claim 21 wherein:
(a) said ratio alternater driver element comprises a crank rotatable at a selected fixed radius from its axis and a stop element extending substantially in the same axial direction as said crank on the opposite side of its axis;

(b) said ratio alternater driven element comprises a member rotatable on a fixed axis offset from said crank axis and having at least two substantially radial slots and the like substantially equally angularly separated, and positive stop lugs disposed about said member axis substantially opposite to each of said slots; and (c) said crank intermittently engages with and disengages from alternate slots while simultaneously disengaging and engaging said stop element with said stop lugs, such that when said crank is disengaged, said driven element is substantially stopped, such being the selected maximum ratio value, and when said crank is engaged with a slot at its minimum radius, said driven element is driven at a selected minimum ratio value, and such that the driving ratio of said elements substantially infinitely varies while said crank engages a slot, relative to the effective driving radii of said crank and slotted member.

25. The ratio alternater of claim 21 wherein:
(a) said ratio alternater driver element comprises a gear element rotatable on an axis aligned radially with the center of one tooth of said gear element; and
(b) said ratio alternater driven element comprises an elongated internal gear element rotatable on an axis parallel with and offset from said driver element axis and having constant gear mesh with said driver element gear element to be rotated thereby to effect an alternating substantially infinitely varying ratio between selected minimum and maximum ratio values, said maximum ratio value being dependent on the radius of the pitch line of said tooth to said driver element axis, relative to said internal gear effective radius.

26. The ratio alternater of claim 21 wherein:
(a) said ratio alternater driver element comprises a radially extending member rotatable on an axis; and
(b) said ratio alternater driven element comprises a crank rotatable at a selected fixed radius from its axis, and drivingly engaged by said radially extending member, such that when said crank is driven by said radially extending member at its minimum radius, then it is driven at a selected maximum ratio value, and when said crank alternately is driven by said radially extending member at its maximum radius then it is driven at a selected minimum ratio value, and the driving ratio of said driver an driven elements substantially infinitely varies between said minimum and maximum ratio values, relative to the effective driving radii of said elements.

27. A multispeed transmission, constantly delivering torque through continuously meshing gear elements while shifting, and comprising:

(a) a plurality of primary driver gear elements of different diameters fixed for rotation with a primary driver shaft element driven by an input shaft on parallel axes, and a like plurality of primary driven gear elements respectively mating when selectively engaged with said primary driver gear elements and fixed for rotation with a driver shaft axially shiftable on an output shaft rotatably fixed and axially aligned with said input shaft;

(b) a ratio alternater comprising:
a ratio alternater driver element fixed for rotation with a ratio alternater drive shaft element diven by said input shaft:
a ratio alternator driven element connected with and rotatably driven by said ratio alternater driver element and fixed for rotation with a ratio alternater output shaft element having its axis offset from the axis of said ratio alternater driver shaft element and parallel to said output shaft; the ratio alternater driver and driven element effective driving radii being substantially infinitely varied between selected minimum and maximum ratio values proportional respectively with the ratios of each two successive primary driver and driven gear elements between which said ratio alternater is functionally employed;

a plurality of ratio alternater driver gear elements fixed for rotation with said ratio alternater output shaft element and respectively functionally employed between each two successive primary driver and driven gear elements;

a like plurality of ratio alternater driven gear elements respectively mating when selectively engaged with said ratio alternater driver gear elements and fixed for rotation with said driven shaft and axially shiftable therewith; and mating sets of primary and ratio alternater driver and driven gear elements being selected and arranged such that only one set can be in full gear element mesh at a time, and while selectively shifting effecting engagement of one set and simultaneous disengagement of another set with overlapping gear element mesh to maintain full gear mesh throughout;

(c) a shifter device comprising:
first shift means selectively axially shifting said driven shaft to effect a driving disengagement of one set of engaged primary driver and driven gear elements while substantially simultaneously effecting engagement of a next set of ratio alternater driver and driven gear elements at such time as the ratio alternater driver gear element becomes driven to substantially synchronous rotational velocity with its mating driven gear element when said ratio alternater is operating substantially at one of said eselected minimum or maximum ratio values depending on whether the shifting is from higher to lower or from lower to higher primary gear ratio;

second shift means subsequently effecting a shift dwell during a rotational interval in which said ratio alternater drivingly alternates said ratio toward the other of said selected ratio values;

third shift means subsequently axially shifting said driven shaft to effect a driving disengagement of said ratio alternater driver and driven gear elements while substantially simultaneously effecting engagement of a next set of primary driver and driven gear elements at such time as the primary driven gear element becomes driven to substantially synchronous rotational velocity with its mating driver gear element when said ratio alternater is operating substantially at the other of said selected ratio values; and means cycling the aforesaid actions of said first, second and third shift means synchronously with the functions of said ratio alternater to automatically sequentially effect the aforesaid driving connecting, disconnecting and dwell operations.

28. The transmission of claim 27 wherein further first, second and third shift means of additional shift cycles sequentially effect driving disengagement of further sets of engaged primary driver and driven gear elements while substantially simultaneously effecting engagement of further sets of ratio alternater driver and driven gear elements, subsequently effecting further shift dwells, and subsequently effecting driving disengagement of such further sets of ratio alternater driver and driven gear elements while substantially simultaneously effecting engagement of next further sets of primary driver and driven gear elements.

29. The transmission of claim 28 wherein:
(a) a direct drive primary driver gear element is fixed for rotation with said input shaft on the end facing said driven shaft;
(b) a direct drive primary driven gear element mating with said direct drive primary driver gear element is fixed for rotation with said driven shaft on the end facing said input shaft; and
(c) a further third shift means selectively axially shifts said driven shaft to effect a driving disengagement of the previously engaged ratio alternater driver and driven gear elements while substantially simultaneously effecting a direct in-line engagement of said direct drive primary driver and driven gear elements at such time as the direct drive primary driven gear element becomes driven to synchronous rotation with said direct drive primary driver gear element when said ratio alternater is operating substantially at its selected minimum ratio value.

30. The transmission of claim 27 and including:
(a) a second ratio alternater comprising:
a second ratio alternater driver element fixed for rotation with the first mentioned ratio alternater output shaft element;
a second ratio alternater driven element connected with and rotatably driven by said second ratio alternater driver element and fixed for rotation with a second ratio alternater output shaft element having its axis offset from the axis of said first ratio alternater output shaft element and parallel to said output shaft, the second ratio alternater driver and driven element effective driving radii being varied between second selected minimum and maximum ratio values, said minimum value being proportional to the ratio of one set of primary driver and driven gear elements, and said maximum value being sufficiently high so as to effect substantially zero rotation of said second ratio alternater driven element;
a second ratio alternater driver gear element fixed for rotation with said second ratio alternater driven element; and
a second ratio alternater driven gear element fixed for rotation with said driven shaft and axially shiftable therewith;
(b) said shifter device including:
another first shift means selectively axially shifting said driven shaft to effect a driving disengagement of said set of engaged primary driver and driven gear elements while substantially simultaneously effecting engagement of said second ratio alternater driver and driven gear elements at such time as the second ratio alternater drive gear element becomes driven to synchronous rotational velocity with its mating driven gear element when said second ratio alternater is operating substantially at said minimum ratio value;
another second shift means subsequently effecting a shift dwell during a rotational interval in which said second ratio alternater drivingly alternates said ratio toward said maximum ratio value thereby decelerating said second ratio alternater output shaft toward substantially zero rotational velocity; and
another third shift means subsequently axially shifting said driven shaft to effect a driving disengagement of said second ratio alternater driver and driven gear elements at such time as their rotational velocities become substantially zero when said second ratio alternater is operating substantially at said maximum ratio value.

31. A multispeed transmission, constantly delivering torque through continuously meshing gear elements while shifting, and comprising:

(a) a plurality of primary driver gear elements of different diameters fixed for rotation with a primary driver shaft element driven by an input shaft on parallel axes, and a like plurality of primary transfer gear elements rotatably fixed on a common axis with said input shaft and respectively in constant driving gear element mesh with said primary driver gear elements and having internal gear elements;
a primary driven gear element respectively mating when selectively engaged with said internal gear elements and fixed for rotation with a driven shaft axially shiftable on and rotatable with an output shaft rotatably fixed and axially aligned with said input shaft;
a primary driven gear element respectively mating when selectively engaged with said internal gear elements and fixed for rotation with a driven shaft axially shiftable on and rotatable with an output shaft rotatably fixed and axially aligned with said input shaft;
(b) a ratio alternater comprising:
a ratio alternater driver element fixed for rotation with said primary driver shaft element;
a ratio alternater driven element connected with and rotatably driven by said ratio alternater driver element and fixed for rotation with a ratio alternater output shaft element having its axis offset from the axis of said primary driver shaft element and parallel to said output shaft, the ratio alternater driver and driven element effective driving ratio being substantially infinitely varied between selected minimum and maximum ratio values proportional respectively with the ratios of each two successive primary driver and driven gear elements between which said ratio alternater is functionally employed.
a plurality of ratio alternater driver gear elements fixed for rotation with said ratio alternater output shaft element and respectively functionally employed between each two successive primary driver and driven gear elements, and a like plurality of ratio alternater transfer gear elements rotatably fixed on a common axis with said output shaft and respectively in constant driving gear element mesh with said ratio alternater driver gear elements, and having internal gear elements;
a ratio alternater driven gear element respectively mating when selectively engaged with said internal gear elements of said ratio alternater transfer gear elements and fixed for rotation with said driven shaft and axially shiftable therewith; and
said internal and respectively mating driven gear elements being selected and arranged such that only one set can be in full gear element mesh at a time, and while selectively shifting effecting engagement of one set and simultaneous disengagement of another set with overlapping gear element mesh to maintain full gear element mesh throughout;
(c) a shifter device comprising:
first shift means selectively axially shifting said driven shaft to effect a driving disengagement of said primary driven gear element from one engaged primary internal gear element while substantially simultaneously effecting engagement of said ratio alternater driven gear element with a next ratio alternater internal gear element at such time as it becomes driven to substantially synchronous rotation with said ratio alternater driven gear element when said ratio alternater is operating substantially at one of said selected minimum or maximum ratio values depending one whether the shifting is from higher to lower or from lower to higher primary gear ratio;

second shift means subsequently effecting a shift dwell during a rotational interval in which said ratio alternater drivingly alternates said ratio toward the other of said selected ratio values;

third shift means subsequently axially shifting said driven shaft to effect a driving disengagement of said ratio alternator driven gear element from its internal gear element while substantially simultaneously effecting engagement of said primary driven gear element with a next primary internal gear element at such time as the primary driven gear element becomes driven to substantially synchronous rotation with its mating internal gear element when said ratio alternater is operating substantially at the other of said selected ratio values; and means cycling the aforesaid actions of said first, second and third shift means synchronously with the functions of said ratio alternater to automatically sequentially effect the aforesaid driving connecting, disconnecting and dwell operations.

32. The transmission of claim 31 wherein further first, second and third shift means of each additional shift cycle sequentially effect driving disengagement of further sets of engaged primary internal and driven gear elements while substantially simultaneously effecting engagement of further sets of ratio alternater internal and driven gear elements, subsequently effecting further shift dwells, and subsequently effecting driving disengagement of such further sets of ratio alternater internal and driven gear elements while substantially simultaneously effecting engagement of next further sets of primary internal and driven gear elements.

33. The transmission of claim 31 and including:
(a) a second ratio alternater comprising:
 a second ratio alternater driver element fixed for rotation with the first mentioned ratio alternater output shaft element;
 a second ratio alternater driven element connected with and rotatably driven by said second ratio alternater driver element and fixed for rotation with a second ratio alternater output shaft element having its axis offset from the axis of said first ratio alternater output shaft element and parallel to said output shaft, the second ratio alternater driver and driven element effective driving ratio being varied between second selected minimum and maximum ratio values, said minimum value being proportional to the ratio of one primary driver and driven gear element, and said maximum being sufficiently high so as to effect substantially zero rotation of said second ratio alternater driven element;
 a second ratio alternater driver gear element fixed for rotation with said second ratio alternater driven element; and
 a second ratio alternater transfer gear element rotatably fixed on said common axis with said output shaft and respectively in constant driving gear element mesh with said second ratio alternater driver gear element, and having an internal gear element respectively mating when selectively engaged with said first mentioned ratio alternater gear element;
(b) said shifter device including:
 another first shift means selectively axially shifting said driven shift to effect driving disengagement of engaged primary internal and driven gear elements while substantially simultaneously effecting engagement of said second ratio alternater internal and driven gear elements at such time as the second ratio alternater internal gear element becomes driven to synchronous rotation with said ratio alternater driven gear elements when said second ratio alternater is operating substantially at said minimum ratio value;
 another second shift means subsequently effecting a shift dwell during a rotational interval in which said second ratio alternater drivingly alternates said ratio toward said maximum ratio value, thereby decelerating said second ratio alternater output "shaft" toward a substantially zero rotational velocity; and
 another third shift means subsequently axially shifting said driven shaft to effect a driving disengagement of said second ratio alternater internal driven gear elements at such time as their rotations become substantially zero when said second ratio alternater is operating substantially at said maximum ratio value.

34. A multispeed transmission, constantly delivering torque through continuously meshing gear elements while shifting, and comprising:
(a) a plurality of primary driver gear elements of different diameters fixed for rotation with an input primary driver shaft element, and a like plurality of primary transfer gear elements respectively in constant driving gear element mesh with said primary driver gear elements, said primary transfer gear elements being rotatably fixed on axes to be in gear element mesh with one common primary driven gear element fixed for rotation with a driven shaft axially shiftable on and rotatable with an output shaft rotatably fixed on an axis parallel to said input primary driver shaft;
(b) a ratio alternater comprising:
 a ratio alternater driver element fixed for rotation with said input primary driver shaft element;
 a ratio alternater driven element connected with and rotatably driven by said ratio alternater driver element and fixed for rotation with a ratio alternater output shaft element having its axis offset from the axis of said input primary driver shaft element and parallel to said output shaft, the ratio alternater driver and driven element effective driving ratio being substantially infinitely varied between selected minimum and maximum ratio values proportional respectively with the ratios of each two successive primary driver and driven gear elements with which said ratio alternater is functionally employed;
 a plurality of ratio alternater driver gear elements fixed for rotation with said ratio alternater output shaft element and respectively functionally employed between each two successive primary driver and driven gear elements, and a like plurality of ratio alternater transfer gear elements respectively in constant driving gear element mesh with said ratio alternater driver gear elements and rotatably fixed on axes to have gear element mesh with one common ratio alternater driven gear element fixed for rotation with said driven shaft and axially shiftable therewith; and
(c) an alternate ratio alternater comprising:
 an alternate ratio alternater driven element connected with and rotatably driven by said alternate ratio driver element and fixed for rotation with an alternate ratio alternater output shaft element having its axis offset from the axis of said alternate ratio alternater driver shaft element and parallel to said output shaft, the alternate ratio alternater driver and driven element effective driving ratio being substantially infinitely varied between selected minimum and maximum ratio values proportional respectively with the ratios of each two successive primary driver and driven gear elements between which said alternate ratio alternater is functionally employed;

an alternate ratio alternater driver gear element fixed for rotation with said alternate ratio alternater output shaft element and functionally employed between two successive primary driver and driven gear elements, and an alternate ratio alternater transfer gear element fixed on an axis to be constantly driven by said alternate ratio alternater gear element and to have gear element mesh with the aforesaid common ratio alternater driven gear element;

(d) said transfer gear elements and respectively mating driven gear elements being selected and arranged such that only one set can be in full gear element mesh at a time, and while selectively shifting effecting engagement of one set and simultaneous disengagement of another set with overlapping gear element mesh to maintain full gear element mesh throughout; and (e) a shifter device comprising:

first shift means selectively axially shifting said driven shaft to effect a driving disengagement of said primary driven gear element from one engaged primary transfer gear element while substantially simultaneously effecting engagement of said ratio alternater gear element with a next ratio alternater transfer gear element at such time as it becomes driven to substantially synchronous rotation with said ratio alternater driven gear element when said ratio alternater is operating substantially at one of said selected minimum or maximum ratio values depending on whether the shifting is from higher to lower or from lower to higher primary gear ratio;

second shift means subsequently effecting a shift dwell during a rotational interval in which said ratio alternater drivingly alternates said ratio toward the other of said selected ratio values;

third shift means subsequently axially shifting said driven shaft to effect a driving engagement of said ratio alternater driven gear element from its transfer gear element while substantially simultaneously effecting engagement of said primary driven gear element with a next primary transfer gear element at such time as the primary driven gear element becomes driven to substantially synchronous rotational velocity with its mating transfer gear element when said ratio alternater is operating substantially at the other of said selected ratio values;

means cycling the aforesaid actions of said first, second and third shift means synchronously with the functions of said ratio alternater to automatically sequentially effect the aforesaid driving connecting, disconnecting and dwell operations;

alternate first shift means selectively axially shifting said driven shaft to effect a driving disengagement of said primary driven gear element from an engaged primary transfer gear element while substantially simultaneously effecting engagement of said ratio alternater driven gear element with an alternate ratio alternater transfer gear element at such time as it becomes driven to substantially synchronous rotational velocity with said ratio alternater driven gear element when said alternate ratio alternater is operating substantially at one of its selected minimum or maximum ratio values depending on whether the shifting is from higher to lower or from lower to higher primary gear ratio;

alternate second shift means subsequently effecting a shift dwell during a rotational interval in which said alternate ratio alternater drivingly alternates said ratio toward the other of its selected ratio values;

alternate third shift means subsequently axially shifting said driven shaft to effect a driving disengagement of said ratio alternater driven gear element from said alternate ratio alternater transfer gear element while substantially simultaneously effecting engagement of said primary driven gear element with a next primary transfer gear element at each time as the primary driven gear element becomes driven to substantially synchronous rotational velocity with its mating transfer gear element when said alternate ratio alternater is operating substantially at the other of its selected ratio values, and means cycling the aforesaid actions of said alternate first, second and third shift means synchronously with the functions of said alternate ratio alternater to automatically sequentially effect the aforesaid alternate driving connecting, disconnecting and dwell operations.

35. A gear-driven clutch transmission, constantly delivering torque while clutching and declutching output and input shafts, and comprising:

(a) a direct drive primary driver gear element fixed for rotation with a primary input driver shaft, and a mating direct drive primary driven gear element facing said primary driver gear element and fixed for rotation with a driven shaft axially shiftable on and rotatable with an output shaft axially aligned with said input shaft such that axial shifting of said driven shaft effects direct interlocking driving gear element mesh engagement of said driver and driven gear elements;

(b) a ratio alternater comprising a ratio alternater driver element fixed for rotation with an operating shaft gear driven by said input shaft;

a ratio alternater driven element connected with and rotatably driven by said ratio alternater driver element and fixed for rotation with a ratio alternater output shaft element having its axis offset from the axis of said operating shaft axis and parallel with said output shaft, the effective driving ratio of said ratio alternater driver and driven elements being varied between selected minimum and maximum ratio values, said minimum ratio value being proportional to the primary driver to driven gear element direct drive ratio and said maximum ratio value being sufficiently high to effect a substantially zero ratio alternater driven element rotation;

a ratio alternater driven gear element fixed for rotation with said ratio alternater driven element; and a mating ratio alternater driven gear element fixed for rotation with said driven shaft and axially shiftable therewith, said primary and ratio alternater driver and driven gear elements being selected and arranged such that only one set can be in full gear element mesh at a time, and while selectively shifting effecting engagement of one set and simultaneous disengagement of another set with overlapping gear element mesh to maintain full gear element mesh throughout;

(c) a shifter device comprising:

first shift means selectively axially shifting said driven shaft to effect a driving engagement of said ratio alternater driver and driven gear elements at such time as the ratio alternater driver gear element becomes driven to substantially zero rotational velocity when said ratio alternater is operating substantially at said maximum ratio value;

second shift means subsequently effecting a shift dwell during a rotational interval in which said ratio alternater drivingly alternates said ratio toward said minimum ratio value, thereby accelerating said output shaft toward direct drive speed;

third shift means subsequently axially shifting said driven shaft to effect a driving disengagement of said ratio alternater driven and driven gear elements while substantially simultaneously effecting engagement of said direct drive primary driver and driven gear elements at such time as the primary driven gear element becomes driven to substantially synchronous rotational velocity with its mating driver gear element when said ratio alternater is operating substantially at said minimum ratio value; and means cycling the aforesaid actions of said first, second and third shift means synchronously with the functions of said ratio alternater to automatically sequentially effect the aforesaid driving connecting, disconnecting and dwell operations; and (d) said shifter device including other first, second and third shift means operable to effect continuing connecting, disconnecting and dwell operations relative to opposite functions of said ratio alternater in reverse of the operations of the first mentioned first, second and third shift means, ending with said third shift means effecting disengagement of said ratio alternater driver and driven gear elements at such time as they are driven to substantially zero rotational velocity.

36. The transmission of claim 35 including a non-rotating element, wherein said first shift means, effecting its driving connections, substantially simultaneously effects a disconnection between said driven gear element and said non-rotatable element, and said other third shift means while effecting said driving disconnection, substantially simultaneously effects a connection between said driven gear elements and said non-rotatable element to substantially prevent said output shaft element from rotation.

37. A dual speed transmission, constantly delivering torque through continuously meshing gear elements while shifting, and comprising:
(a) a direct drive primary driver gear element fixed for rotation with a primary input driver shaft and a second speed primary driver gear element fixed for rotation with an operating shaft driven by said input shaft on parallel axes, and a direct drive primary driven gear element facing said direct drive primary driver gear element and a second speed primary driven gear element both fixed for rotation with a driven shaft axially shiftable on and rotatable with an output shaft axially aligned with said input shaft such that axial shifting of said driven shaft alternately effects engagement of said first speed driver and driven gear elements or direct interlocking driving gear element mesh engagement of said direct drive gear elements;
(b) a ratio alternater comprising:
a ratio alternater driver element fixed for rotation with an operating shaft gear driven by said input shaft;
a ratio alternater driven element connected with and rotatably driven by said ratio alternater driver element and fixed for rotation with a ratio alternater output shaft element having its axis offset from the axis of said operating shaft axis and parallel with said output shaft, the effective driving ratio of said ratio alternater driver and driven elements being substantially infinitely varied between selected minimum and maximum ratio values, said values being proportional to the direct drive and second speed ratios;
a ratio alternater driver gear element fixed for rotation with said ratio alternater driven element;
a mating ratio alternater driven gear element fixed for rotation with said driven shaft and axially shiftable therewith; and
mating sets of primary and ratio alternater driver and driven gear elements being selected and arranged such that only one set can be in full gear element mesh at a time, and while selectively shifting effecting engagement of one set and simultaneous disengagement of another set with overlapping gear element mesh to maintain full gear element mesh throughout; and (c) a shifter device comprising:
first shift means selectively axially shifting said driven shaft to effect a driving disengagement of said second speed primary driver and driven gear elements while simultaneously effecting engagement of said ratio alternater driver and driven gear elements at such time as the ratio alternater driver gear element becomes driven to substantially synchronous rotational velocity with its mating driven gear element when said ratio alternater is operating substantially at one of said selected minimum or maximum ratio values depending on whether the shifting is from higher to lower or from lower to higher primary gear ratio;
second shift means subsequently effecting a shift dwell during a rotational interval in which said ratio alternater drivingly alternates said ratio toward the other of said selected ratio values;
third shift means subsequently axially said driven shaft to effect a driving disengagement of said alternater driver and driven element while substantially simultaneously effecting engagement of said direct drive primary driver and driven gear elements at such time as said direct drive primary driven gear element becomes driven to substantially synchronous rotation with its mating direct drive primary driver gear element when said ratio alternater is operating substantially at the other of said selected ratio values; and
means cycling the aforesaid actions of said first, second and third shift means synchronously with the functions of said ratio alternater to automatically sequentially effect the aforesaid driving connecting, disconnecting and dwell operations.

References Cited

UNITED STATES PATENTS

| | | | |
|---|---|---|---|
| 2,525,335 | 10/1950 | Berndt | 74—339 |
| 2,833,160 | 5/1958 | Morgan | 74—339 |
| 3,182,778 | 5/1965 | Droschel | 74—339 |

ARTHUR T. McKEON, Primary Examiner